(12) United States Patent
Lu et al.

(10) Patent No.: US 12,159,036 B2
(45) Date of Patent: Dec. 3, 2024

(54) INTELLIGENT ACCESS REQUEST PROCESSING BY A STORAGE DEVICE USING AI MODEL TRAINING

(71) Applicant: HUAWEI TECHNOLOGIES CO., LTD., Shenzhen (CN)

(72) Inventors: Peng Lu, Johannesburg (ZA); Jinhu Liu, Chengdu (CN); Xiaodong Du, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 221 days.

(21) Appl. No.: 17/590,167

(22) Filed: Feb. 1, 2022

(65) Prior Publication Data
US 2022/0155970 A1    May 19, 2022

Related U.S. Application Data

(63) Continuation of application No. PCT/CN2020/088822, filed on May 6, 2020.

(30) Foreign Application Priority Data

Aug. 2, 2019 (CN) .......................... 201910713053.0

(51) Int. Cl.
G06F 3/06 (2006.01)
G06F 18/214 (2023.01)

(52) U.S. Cl.
CPC .......... *G06F 3/0613* (2013.01); *G06F 3/0647* (2013.01); *G06F 3/0659* (2013.01); *G06F 3/067* (2013.01); *G06F 3/0683* (2013.01); *G06F 18/214* (2023.01)

(58) Field of Classification Search
CPC .... G06F 3/0613; G06F 3/0647; G06F 3/0659; G06F 3/067; G06F 3/0683; G06F 18/214; G06F 3/061; G06F 3/065; G06F 3/0656; G06F 13/20; G06F 9/4881; G06F 9/5038; G06F 13/364; G06N 3/045; G06N 20/20; G06N 5/01; G06N 3/084
See application file for complete search history.

(56) References Cited

U.S. PATENT DOCUMENTS

| | | | |
|---|---|---|---|
| 2016/0350649 A1* | 12/2016 | Zhang | G06N 3/084 |
| 2019/0108223 A1* | 4/2019 | Fabijancic | G06F 8/30 |
| 2019/0108445 A1 | 4/2019 | Huang et al. | |
| 2019/0121566 A1 | 4/2019 | Gold et al. | |

(Continued)

FOREIGN PATENT DOCUMENTS

| | | |
|---|---|---|
| CN | 108667850 A | 10/2018 |
| CN | 108718296 A | 10/2018 |
| CN | 108875057 A | 11/2018 |

(Continued)

*Primary Examiner* — Sean D Rossiter
(74) *Attorney, Agent, or Firm* — Rimon PC

(57) ABSTRACT

This disclosure provides an access request processing method, a storage device, and a storage system. In embodiments of this disclosure, a first storage device receives an artificial intelligence (AI) model from a second storage device, wherein the AI model is obtained by the second storage device through training based on historical input output (IO) requests in historical running processes. The first storage device obtains a prediction result of the AI model based on an access request received by the first storage device.

12 Claims, 10 Drawing Sheets

(56) References Cited

U.S. PATENT DOCUMENTS

2020/0192572 A1\* 6/2020 Dwarampudi .......... G06F 3/064
2020/0250477 A1\* 8/2020 Barthur ............... G06F 18/2411

FOREIGN PATENT DOCUMENTS

| CN | 109564505 A | 4/2019 | |
|---|---|---|---|
| CN | 109581928 A | 4/2019 | |
| CN | 109918752 A | 6/2019 | |
| CN | 110018970 A | 7/2019 | |
| WO | WO-2018050102 A1 \* | 3/2018 | .......... G06F 11/1448 |

\* cited by examiner

INTELLIGENT ACCESS REQUEST PROCESSING BY A STORAGE DEVICE USING AI MODEL TRAINING

CROSS-REFERENCE TO RELATED APPLICATIONS

This application is a continuation of International Application No. PCT/CN2020/088822, filed on May 6, 2020, which claims priority to Chinese Patent Application No. 201910713053.0, filed on Aug. 2, 2019. The disclosures of the aforementioned applications are hereby incorporated by reference in their entireties.

TECHNICAL FIELD

This disclosure relates to the field of storage technologies, and in particular, to an access request processing method and apparatus, a device, and a storage medium.

BACKGROUND

With the advancement of storage technologies and artificial intelligence (AI) technologies, AI modeling can be utilized to learn the access patterns to the data stored on a storage device by upper level applications. When the storage device receives an access request, based on the access request, the storage device may predict a to-be-used instruction or to-be-used data by using the AI model, so as to perform cache prefetch, or predict, by using the AI model, the workload for sending the access request, so as to implement a workload identification function, or predict, by using the AI model, the quantity of resources that need to be allocated to process the access request, so as to implement an intelligent scheduling function.

In a running process, the storage device performs model training based on input output (IO) requests, to obtain the AI model. Specifically, in an initialization process of the storage device, the storage device creates an AI model, and sets the parameters of the AI model to preset initial values, to obtain an initial AI model. Then once the storage device is started each time the storage device receives an IO request for stored data, the storage device obtains the prediction result of the initial AI model based on the IO request, and then adjusts the parameters of the initial AI model based on the error of the prediction result. The initial AI model is not used as a trained AI model until the error of the prediction result is less than an error threshold.

In a related technology, in a data migration scenario, for example, when data stored in an old storage device needs to be moved to a new storage device for storage, each of the old storage device and the new storage device needs to perform a model training procedure for the data. Specifically, in historical running processes of the old storage device, clients send historical IO requests to the old storage device, and the old storage device receives the historical IO requests, where the historical IO requests are used to request to read data or write data. The old storage device performs model training based on the historical IO requests, to obtain an AI model. When the data needs to be migrated, the old storage device sends the data to the new storage device. The new storage device receives the data from the old storage device, and stores the data, so that data migration is completed. Subsequently, the client sends IO requests to the new storage device. After receiving the IO requests, the new storage device performs a model retraining procedure based on the IO requests, to re-obtain an AI model.

When the foregoing method is used, the new storage device needs to perform model retraining to obtain the AI model. Model retraining consumes a quite long time, which affects the efficiency of the new storage device in providing functions such as cache prefetch, load identification, and intelligent scheduling by using the AI model.

SUMMARY

Embodiments of this disclosure provide an access request processing method and apparatus, a device, and a storage medium, so as to avoid time overheads caused by model retraining by a new storage device, and improve the efficiency of the new storage device in providing a function by using an AI model.

According to a first aspect, an access request processing method is provided, where the method is applied to a first storage device. The method includes: receiving data and an artificial intelligence AI model from a second storage device, where the AI model is obtained by the second storage device through training based on historical input output IO requests for the data in historical running processes; storing the data and the AI model; receiving an access request for the data; and obtaining a prediction result of the AI model based on the access request.

In a scenario in which the data is migrated from the second storage device to the first storage device, the AI model is also migrated from the second storage device to the first storage device, so that the first storage device can reuse the AI model trained by the second storage device, to obtain the prediction result of the AI model. This avoids a procedure of model retraining by the first storage device, and therefore avoids time overheads caused by AI model retraining by the first storage device. Because the first storage device obtains the AI model more quickly, the first storage device obtains the prediction result based on the AI model more quickly, and therefore the first storage device provides functions such as cache prefetch, load identification, and intelligent scheduling based on the prediction result more quickly. This greatly improves the efficiency of the first storage device in cache prefetch, load identification, and intelligent scheduling.

Optionally, the data belongs to a first logical storage unit LUN of the second storage device, and the AI model is a target AI model of the first LUN.

Considering that different LUNs of the same storage device usually store data of different workloads, and different workloads usually have different data access patterns, rules of IO requests sent to corresponding LUNs also vary with different workloads. Therefore, a LUN is used as a granularity; in regard to an IO request for the data belonging to the first LUN, the prediction result is obtained by reusing the AI model of the first LUN. In this way, flexibility is high. In addition, because the AI model is obtained through training based on the IO requests for the data belonging to the first LUN, parameters of the AI model can match the first LUN. Therefore, reuse of the AI model is more refined, thereby improving accuracy of the prediction results of the AI model.

Optionally, after the receiving data and an artificial intelligence AI model from a second storage device, the method includes: creating a second LUN; and obtaining, based on the AI model of the first LUN, an AI model of the second LUN.

In a scenario in which a storage device creates a LUN, an AI model of the newly created LUN is obtained by reusing an AI model of an existing LUN. In this way, a procedure of model training for the newly created LUN is avoided, thereby avoiding time costs caused by model training for the newly created LUN. Because the AI model of the newly created LUN is obtained more quickly, a prediction result is obtained based on the AI model more quickly, and therefore, functions such as cache prefetch, load identification, and intelligent scheduling are provided for the newly created LUN based on the prediction result more quickly. This greatly improves the efficiency of cache prefetch, load identification, and intelligent scheduling for the newly created LUN.

Optionally, the obtaining, based on the AI model of the first LUN, an AI model of the second LUN includes any one of the following: selecting one AI model from the AI models of one or more first LUNs, as the AI model of the second LUN; or performing weighted averaging on the AI models of one or more first LUNs, to obtain the AI model of the second LUN.

In this optional manner, a plurality of manners of reusing the AI models of historically created LUNs are provided, thereby improving flexibility.

Optionally, weights of all the first LUNs are the same; or the weight of each first LUN is positively correlated with the proportion of the corresponding application identifier in the application identifiers corresponding to all the first LUNs; or the weight of each first LUN is positively correlated with the proportion of the corresponding user identifier in the user identifiers corresponding to all the first LUNs.

In this optional manner, among all the first LUNs, the access pattern of a LUN corresponding to an application identifier or a user identifier accounting for a comparatively larger proportion is more common and representative, and therefore, the AI models of such LUNs can reflect the access pattern of the newly created LUN more accurately. In this case, comparatively higher weights are set for such LUNs, and the AI model is obtained for the newly created LUN with reference to a weight of each LUN and the AI model of each LUN, so that accuracy of the AI model of the newly created LUN can be improved.

Optionally, before the creating a second LUN, the method further includes: allocating shared storage space, where the shared storage space is used to store the AI model of each LUN; the storing the data and the AI model includes: writing the AI model of the first LUN to the shared storage space; and after the obtaining, based on the AI model of the first LUN, an AI model of the second LUN, the method further includes: writing the AI model of the second LUN to the shared storage space.

In this optional manner, AI models of all the LUNs are all stored in the shared storage space, so that the AI models of all the LUNs can be managed together.

Optionally, after the obtaining a prediction result of the AI model based on the access request, the method further includes:

adjusting the parameters of the AI model based on the prediction result.

In this optional manner, the new storage device can perform, based on the received access request, model fine-tuning on the AI model trained by the old storage device, to optimize the AI model with reference to a running process of the new storage device, so that after the parameters of the AI model are adjusted, the parameters better match the data access process performed on the new storage device. In this way, accuracy of the AI model is improved.

Optionally, the AI model includes a first AI model, and the obtaining a prediction result of the AI model based on the access request includes: inputting the access request into the first AI model, and outputting a target access request, where the target access request indicates an instruction or data that is to be used by a processor of the first storage device; and after the obtaining a prediction result of the AI model based on the access request, the method further includes: writing the instruction or data to a cache of the first storage device.

In this optional manner, a cache prefetch function is implemented by using the AI model. A mapping relationship between a currently received IO request and a to-be-received IO request is learned by using the first AI model, so that when an IO request is received, a to-be-received IO request can be predicted by using the first AI model, thereby determining which instruction or data is to be used by the processor. Then, the instruction or data is written to the cache in advance, and when the processor needs to use the instruction or data, the processor can directly read the instruction or data from the cache. Therefore, the execution speed of the processor is increased.

Optionally, the AI model includes a second AI model, and the obtaining a prediction result of the AI model based on the access requests includes: collecting statistics about the access requests in a current time period to obtain an access characteristic; and inputting the access characteristic into the second AI model, and outputting workload information, where the workload information indicates a workload for sending the access request.

In this optional manner, a workload identification function is implemented by using the AI model. A mapping relationship between an access request and a workload for sending the access request is learned by using the second AI model. When an access request is received, a workload for sending the access request can be accurately predicted by using the second AI model.

Optionally, the AI model includes a third AI model, and the obtaining a prediction result of the AI model based on the access request includes: inputting the access request and a first allocation information into the third AI model, and outputting a second allocation information, where the first allocation information indicates at least one of a processing resource, a storage resource, or a network resource currently allocated to each task; and after the obtaining a prediction result of the AI model based on the access request, the method further includes: allocating at least one of the processing resource, the storage resource, or the network resource to each task based on the second allocation information.

In this optional manner, an intelligent scheduling function is implemented by using the AI model. A mapping relationship between a resource that needs to be allocated, and an access request and a resource allocation status is learned by using the third AI model. When an access request is received, a resource that needs to be allocated to each task in the case of the current access request and a current resource allocation status can be accurately predicted by using the third AI model, so that a resource can be scientifically allocated to each task based on a prediction result.

According to a second aspect, an access request processing apparatus is provided, where the apparatus is applied to a first storage device. The apparatus has a function of implementing access request processing in any one of the first aspect or the optional manners of the first aspect. The apparatus includes at least one module, and the at least one module is configured to implement the method provided in any one of the first aspect or the optional manners of the first aspect.

According to a third aspect, a first storage device is provided. The first storage device includes one or more processors and one or more memories. The one or more memories store at least one instruction. The instruction is executed by the one or more processors to implement the method provided in any one of the first aspect or the optional manners of the first aspect.

According to a fourth aspect, a computer-readable storage medium is provided. The storage medium stores at least one instruction. The instruction is executed by a processor to implement the method provided in any one of the first aspect or the optional manners of the first aspect.

According to a fifth aspect, a computer program is provided. The computer program includes an instruction used to perform any one of the first aspect or the optional manners of the first aspect.

According to a sixth aspect, a chip is provided. The chip is configured to perform the method provided in any one of the first aspect or the optional manners of the first aspect.

DESCRIPTION OF EMBODIMENTS

Figure 1:
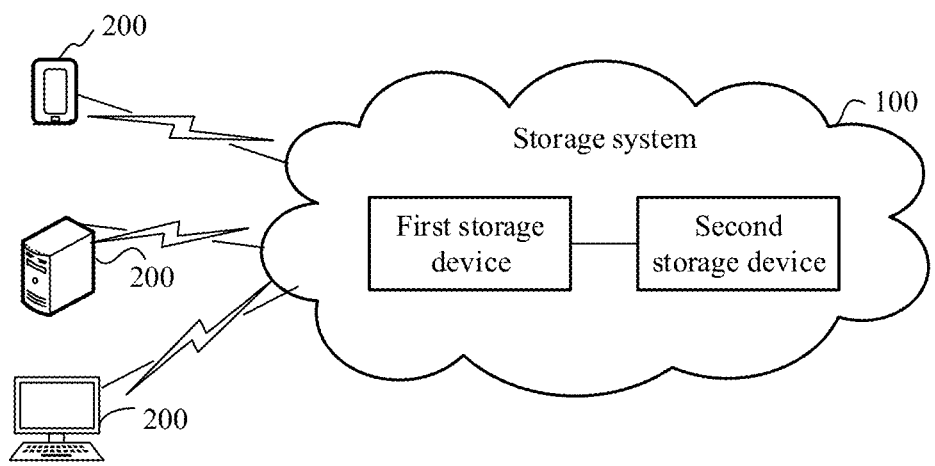
FIG. 1 is an architectural diagram of an implementation environment of an access request processing method according to an embodiment of this disclosure.

To make the objectives, technical solutions, and advantages of this disclosure clearer, the following further describes the embodiments of this disclosure in detail with reference to the accompanying drawings.

The term "and/or" in this disclosure describes only an association relationship for describing associated objects and represents that three relationships may exist. For example, A and/or B may represent the following three cases: Only A exists, both A and B exist, and only B exists. In addition, the character "/" in this disclosure generally indicates an "or" relationship between the associated objects.

In this disclosure, the term "a plurality of" means two or more. For example, a plurality of data packets mean two or more data packets.

In this disclosure, the terms "first", "second", and the like are used to distinguish between same or similar items whose effects and functions are basically the same. It should be understood that there is no logical or time-sequence dependency between "first", "second", and "$n^{th}$", and a quantity and an execution sequence are not limited, either.

Terms used in this disclosure are explained below.

IO request: An IO request may include an access request or a write request. An access request is used to request to read data from a storage device. A write request is used to request to write data to a storage device. An IO request may include a storage location on a storage device. For example, an IO request may include a start sector identifier and a sector quantity. Based on the IO request, starting from a start sector corresponding to the start sector identifier, sectors of the sector quantity may be consecutively read, to fetch data from the read sectors or write data to the read sectors.

Access characteristic: An access characteristic is a characteristic of access requests in a period of time. For example, an access characteristic may include but is not limited to one or more of an access request size, a maximum access request, a minimum access request, an average access request, consecutive access, random access, serial access, or parallel access in a period of time.

Access request size: An access request size may be represented by a quantity of consecutive sectors that is carried in an access request. For example, when a quantity of consecutive sectors that is carried in an access request is quite large, for example, 128 or 64, the access request may be considered as a large access request; when a quantity of consecutive to-be-read sectors that is carried in an access request is quite small, for example, 1, 4, or 8, the access request may be considered as a small access request.

Consecutive access: Consecutive access means that a start storage location corresponding to a currently received access request and an end storage location corresponding to an access request received last time are completely consecutive; or there is an interval between a start storage location corresponding to a currently received access request and an end storage location corresponding to an access request received last time, but the interval is less than a threshold. For consecutive access, because a currently accessed storage location is quite close to a storage location accessed last time, a magnetic head scarcely needs to switch to a new track, or a track switching time is extremely short.

Random access: Random access means that an interval between a start sector address corresponding to a current access request and an end sector address corresponding to a previous access request is greater than a threshold. For random access, because a current start sector is quite far away from a previous end sector, a magnetic head needs to switch to a new track. Therefore, read/write efficiency of random access is comparatively low.

Serial access: Serial access depends on whether a quantity of instructions sent by a controller to a plurality of hard disks each time is 1 or greater than 1. When the quantity of instructions is 1, all access requests in an access queue cached in the controller need to be processed one by one. This case is serial access.

Parallel access: When a controller simultaneously sends instructions to a plurality of hard disks, a plurality of access requests can be simultaneously executed each time. This case is parallel access.

AI model: In the embodiments of this disclosure, an AI model is used to learn, through model training based on historical IO requests received by a storage device, an access pattern of data stored in the storage device. When a data access request is received, the AI model can provide a prediction result. For example, the AI model may be a supervised machine learning model. A type of the AI model may be but is not limited to one or more of a neural network model, a decision tree model, a random forest model, a logistic regression model, a support vector machine, a confidence network, a reinforcement learning model, a transfer learning model, or an inductive learning model.

Cache prefetch: Cache prefetch is a technology of predicting an instruction and/or data that is to be used by a processor, and storing the instruction and/or data into a cache in advance before the instruction and/or data is actually used. Through cache prefetch, data can be written to the cache in advance, so that a processor can directly read/write the data in the cache when the processor actually needs to use the data. This can avoid a failure, of the processor in accessing the cache, caused by cache expiration, and therefore can avoid clock cycle overheads caused by a failure of the processor in accessing the cache. In this way, processor stalling is avoided, thereby increasing an execution speed of the processor.

Workload: A workload is a service running carrier. In a service processing process, a workload sends an access request to a storage device to access the storage device, so as to read data from or write data to the storage device. A workload may be a physical computing device, such as a server or a host, or may be a virtual device, such as a virtual machine, a container, or a pod (a pod is a basic unit for running, managing, and orchestrating a containerized application in Kubernetes).

Workload identification: Workload identification is a function of identifying a workload for sending an access request. Usually, access behaviors of a same workload exhibit certain patterns. In this embodiment, during historical running, an AI model may learn an access behavior pattern of a workload through model training based on historical access requests sent by the workload, to obtain a mapping relationship between an access request and a workload. Therefore, after model training is completed, when an access request is input into the AI model, the AI model can output workload information, so as to indicate, by using the workload information, which workload or workloads send the access request.

Intelligent scheduling: Intelligent scheduling means automatically allocating at least one of a processing resource, a storage resource, or a network resource to each task executed by a storage device. The processing resource may be a resource obtained by dividing a processor. For example, the processing resource may be a resource obtained by dividing a central processing unit (CPU), for example, may be a CPU core. For another example, the processor may be a resource obtained by dividing a field-programmable gate array (FPGA) resource, for example, a cabling partition. The storage resource may be a resource obtained by dividing a memory, for example, may be memory space.

The network resource may be a resource obtained by dividing a transceiver, for example, may be bandwidth or a quantity of ports. In the embodiments, intelligent scheduling may be performed by using an AI model. Specifically, the AI model may obtain, through learning, a quantity of processing resources that need to be allocated to each task in the case of a currently received access request and a currently allocated processing resource; and/or the AI model obtains, through learning, a quantity of storage resources that need to be allocated to each task in the case of a currently received access request and a currently allocated storage resource; and/or the AI model obtains, through learning, a quantity of network resources that need to be allocated to each task in the case of a currently received access request and a currently allocated network resource. At least one of a corresponding processing resource, storage resource, or network resource may be allocated based on a prediction result of the AI model, thereby implementing a more scientific and more accurate resource scheduling function.

LUN: A LUN is a logical disk obtained through virtualization by using storage hardware. An operating system of a storage device usually considers a LUN as a usable hard disk.

Model fine-tuning: Model fine-tuning means training an AI model that has been trained, to adjust the parameters of the AI model that has been trained. A process of model fine-tuning is similar to a process of model training. A difference lies in that, during model training, model parameters are initialized in a preset manner corresponding to an AI model, for example, Gaussian or random initialization, whereas during model fine-tuning, parameters of a trained model are used for initialization, that is, parameters of the trained model are used as initialization parameters of the model before fine-tuning. Optionally, a learning rate of model fine-tuning may be less than a learning rate of model training. Optionally, during model fine-tuning, only some of layers of a model may be trained, for example, a weight of only the last one or more layers of a network is trained.

The following describes an example of a system architecture in this disclosure.

FIG. 1 is an architectural diagram of an implementation environment of an access request processing method according to an embodiment of this disclosure. The implementation environment includes a storage system 100 and a client 200. The storage system 100 and the client 200 may establish a communication path, to communicate with each other by using the communication path.

The storage system 100 includes a first storage device and a second storage device. The first storage device may establish a wired or wireless network connection to the second storage device, to communicate with the second storage device through the network connection. Structures of the first storage device and the second storage device may be shown in an embodiment in FIG. 2. The first storage device may interact with the second storage device to perform a method in the following embodiment in FIG. 3. In addition, the first storage device may further perform a method in the following embodiment in FIG. 7.

The client 200 may be any device that can access data. For example, the client 200 may be an application server, a host, or a terminal. The storage system 100 may provide a data storage service for the client 200. Specifically, the client 200 may generate an IO request based on to-be-stored data, and send the IO request to the storage system 100. The IO request carries the data that needs to be stored. The storage system 100 may receive the IO request from the client 200, obtain the data from the IO request, and store the data.

In some possible embodiments, the storage system 100 may be provided for a user as a cloud storage service. Specifically, the storage system 100 may run in a cloud environment, for example, may run on a public cloud, a private cloud, or a hybrid cloud. The user may use the client 200 to apply for storage space of a capacity in the cloud storage service. The cloud storage service may allocate one or more pieces of storage space to the user, so as to store, in the allocated storage space, data that the user needs to store. For example, the storage system 100 may be provided as an object storage service (OBS), an elastic volume service, or a cloud database.

A person skilled in the art may know that, in the implementation environment shown in FIG. 1, a quantity of storage devices in the storage system 100 and a quantity of clients 200 may be larger or smaller. For example, the storage system 100 may include dozens of, hundreds of, or more storage devices. In this case, the implementation environment further includes storage devices other than the first storage device and the second storage device. In addition, there may be only one client 200, or there may be dozens of, hundreds of, or more clients 200. In this case, the implementation environment further includes other clients 200.

The following describes an example of a hardware structure in this disclosure.

Figure 2:
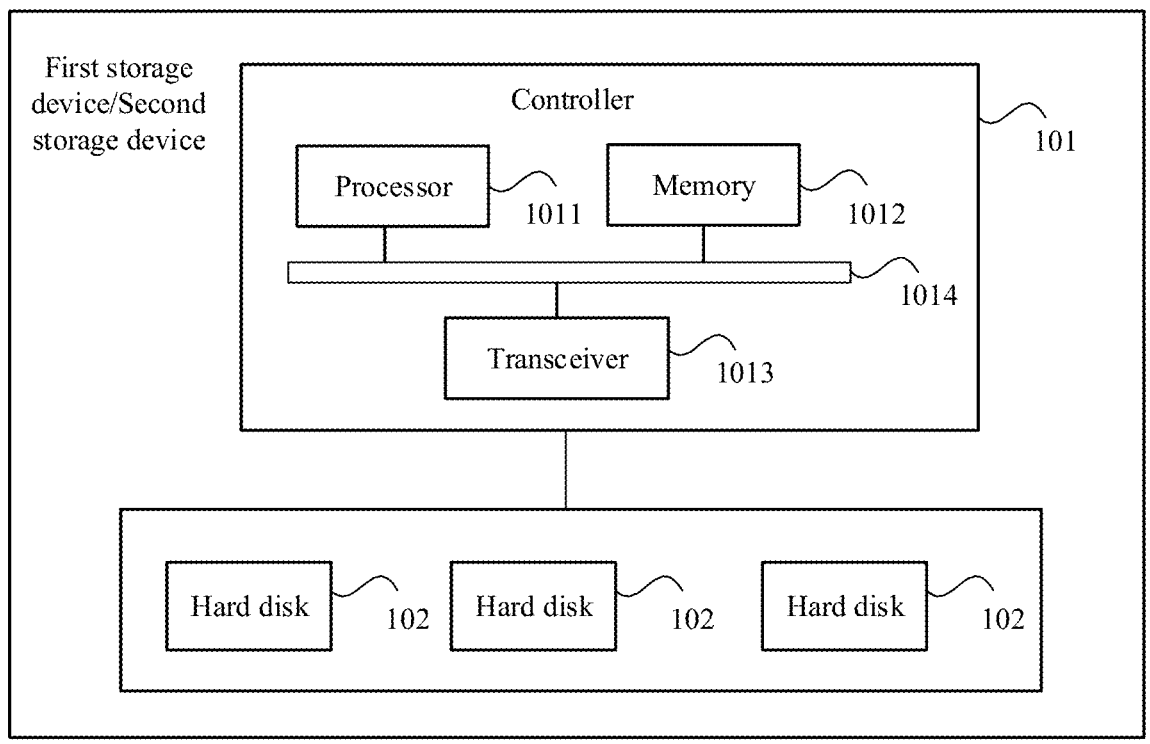
FIG. 2 is a schematic diagram of a structure of a first storage device or a second storage device according to an embodiment of this disclosure.

FIG. 2 is a schematic diagram of a structure of a first storage device or a second storage device according to an embodiment of this disclosure. For example, the first storage device or the second storage device may be a storage array, and the storage array may include a controller 101 and a hard disk 102.

The controller 101 may be a dedicated storage array controller, or may be a server or host on which control software is installed. The controller 101 may vary greatly with configuration or performance. Usually, the controller 101 may include a processor 1011, a memory 1012, a transceiver 1013, and a bus 1014.

The processor 1011 may be a central processing unit (CPU), an AI chip, a field-programmable gate array (FPGA), an application-specific integrated circuit (ASIC), a programmable logic device (PLD), a state machine, gate logic, a discrete hardware component, or any other suitable circuit. There may be one or more processors 1011. A quantity of processors 1011 is not limited in this embodiment.

The memory 1012 stores at least one instruction, and the at least one instruction is executed by the processor 1011 to implement an access request processing method illustrated in the following method embodiment. The memory 1012 may include at least one of a volatile memory or a non-volatile memory. For example, the memory 1012 may include at least one of a random access memory (RAM), a read-only memory (ROM), a hard disk drive (HDD), a solid-state drive (SSD), a compact disc read-only memory (CD-ROM), a magnetic tape, a floppy disk, an optical data storage device, or a flash memory.

The transceiver 1013 may be a wired or wireless network interface. The transceiver 1013 of the first storage device may be configured to communicate with the second storage device. The transceiver 1013 of the second storage device may be configured to communicate with the first storage device.

The bus 1014 is connected to the processor 1011, the memory 1012, and the transceiver 1013. The processor 1011, the memory 1012, and the transceiver 1013 may communicate by using the bus 1014.

The hard disk 102 may be but is not limited to an HDD or an SSD. The hard disk 102 may be configured to persistently store data and an AI model. In some possible embodiments, the hard disk 102 may be virtualized into one or more LUNs, and the hard disk 102 may store data of each LUN and an AI model of each LUN.

The controller 101 may be communicatively connected to the hard disk 102. A communication connection manner may be but is not limited to any one of a bus, a network, or a switching device. The bus may be but is not limited to any one of a peripheral component interconnect express (PCIe) bus, a small computer system interface (SCSI), a Huawei cache coherent system (HCCS), the Ethernet, infiniband (IB), and a fibre channel (FC). The network may be a wired or wireless network, such as the Ethernet. The switching device may be a switch, such as a fibre channel switch.

It should be noted that, in FIG. 2, an example in which the first storage device or the second storage device includes one controller 101 is used. In some possible embodiments, the first storage device or the second storage device may alternatively include two or more controllers 101. Steps in the following method embodiment may be separately performed by different controllers 101, so as to split up an overall computation amount.

The following describes an example of a method procedure in this disclosure.

Figure 3:
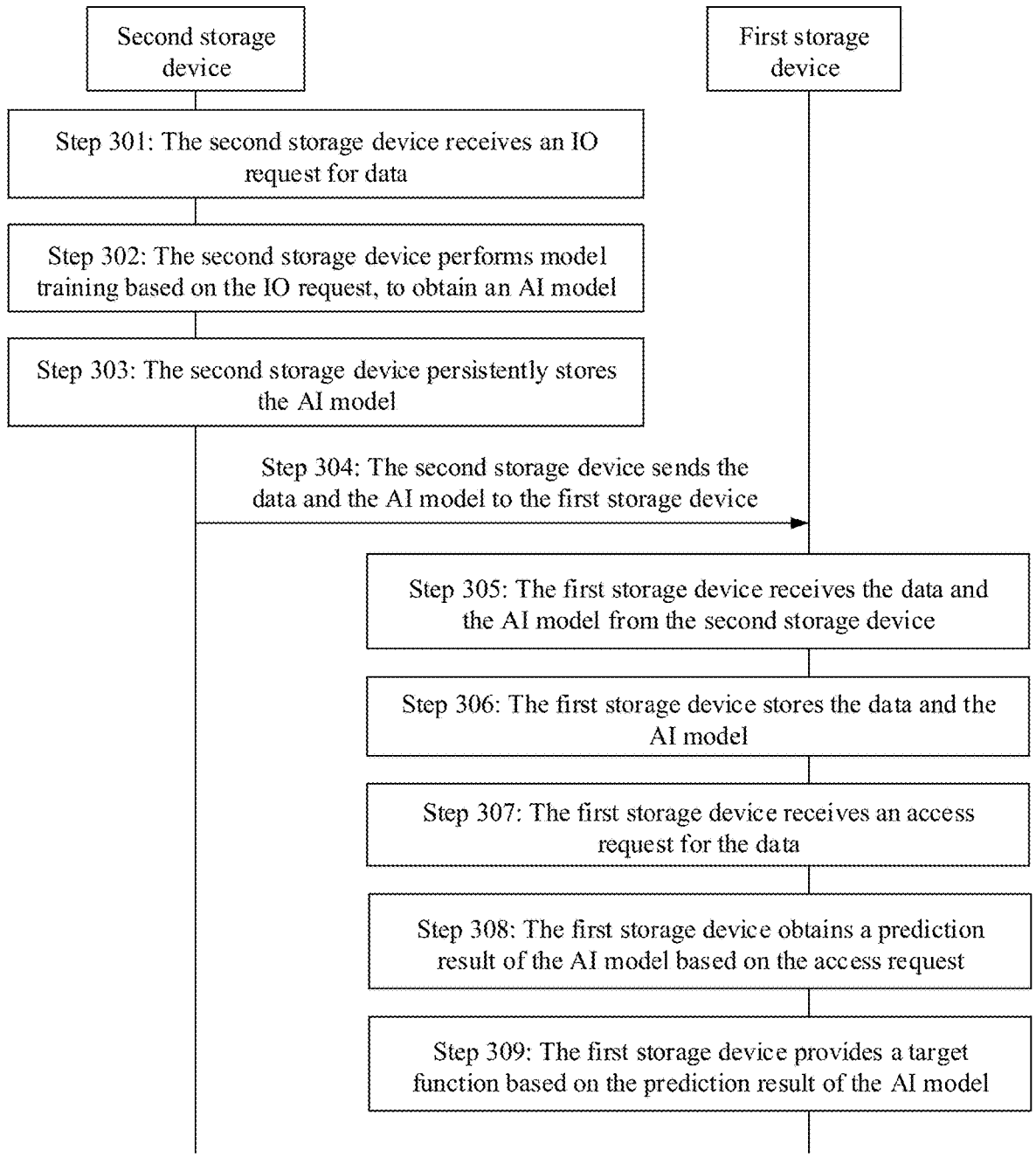
FIG. 3 is a flowchart of an access request processing method according to an embodiment of this disclosure.

FIG. 3 is a flowchart of an access request processing method according to an embodiment of this application. As shown in FIG. 3, the method is described by using an example in which a first storage device and a second storage device interact to perform the method. The method includes steps 301 to 309 below.

Step 301: The second storage device receives an IO request for data.

For example, as shown in FIG. 1, a transmit end of the IO request may be the client 200 in FIG. 1, and the second storage device may receive the IO request from the client 200. Certainly, the IO request may be alternatively sent by a device other than the client to the second storage device. The transmit end of the IO request is not limited in this embodiment.

Step 302: The second storage device performs model training based on the IO request, to obtain an AI model.

In some possible embodiments, a model training process may include step (1) to step (5) below.

Step (1): The second storage device creates an initial AI model.

Specifically, a hyperparameter of the AI model may be preset before model training. The hyperparameter may be used to determine a structure of the AI model. For example, when the AI model is a neural network model, the hyperparameter may include a quantity of hidden layers, a convolution kernel size, a convolution operation step, a quantity of convolution kernels, or the like of the neural network model. When the AI model is a decision tree, the hyperparameter may include a quantity of leaf nodes, a depth of the decision tree, or the like. When the AI model is a random forest, the hyperparameter may include a quantity of decision trees or the like. The second storage device may store the hyperparameter, and create the initial AI model based on the hyperparameter. In addition, the second storage device may initialize a model parameter other than the hyperparameter in the initial AI model. For example, the second storage device may perform random initialization or Gaussian initialization on the model parameter. For another example, the second storage device may set the model parameter to a preset value.

In some possible embodiments, the second storage device may create different initial AI models for different application scenarios. For example, the initial AI model may include one or more of a first initial AI model, a second initial AI model, or a third initial AI model. The first initial AI model is used to obtain, through training, an AI model (a first AI model) used for cache prefetch. The second initial AI model is used to obtain, through training, an AI model (a second AI model) used for workload identification. The third initial AI model is used to obtain, through training, an AI model (a third AI model) used for intelligent scheduling. For example, the first initial AI model may be a neural network model, for example, may be a convolutional neural network or a recurrent neural network; and the second initial AI model may be a decision tree, a random forest, or an XGBoost (a machine learning model that integrates many weak classifiers to form a strong classifier).

Step (2): The second storage device obtains a prediction result of the initial AI model based on the IO request.

For an application scenario of cache prefetch, the second storage device may input the IO request into the first initial AI model, and the first initial AI model may predict, based on the IO request, an instruction or data that is to be used by a processor of the second storage device, and output a target IO request. The target IO request indicates the instruction or data that is to be used by the processor of the second storage device. For example, the target IO request may carry a storage address of the instruction or data.

For an application scenario of workload identification, the second storage device may collect statistics about the IO requests in a current time period, to obtain an access characteristic; input the access characteristic into the second initial AI model; and output workload information. An end point of the current time period may be a current time point, and duration of the current time period may be preset duration. The workload information indicates a workload for sending the IO request. For example, the workload information may include an identifier of the workload. The identifier of the workload may be but is not limited to an identity (ID), a name, a number, or the like of the workload.

For an application scenario of intelligent scheduling, the second storage device may input the IO request and first allocation information into the third initial AI model, and output second allocation information. The first allocation information indicates at least one of a processing resource, a storage resource, or a network resource currently allocated to each task. The second allocation information indicates at least one of a processing resource, a storage resource, or a network resource that needs to be allocated to each task and that is predicted by the AI model. In a possible implementation, the third initial AI model may allocate at least one of a processing resource, a storage resource, or a network resource to each task based on a priority of the task. A higher priority of a task indicates that more processing resources may be allocated to the task, more storage resources may be allocated to the task, and more network resources may be allocated to the task, so as to increase a processing speed of the task.

Step (3): The second storage device obtains an error of the prediction result.

The second storage device may obtain a reference result, and compare the prediction result with the reference result, to obtain the error of the prediction result. The error of the prediction result indicates an accuracy degree of the prediction result. For example, the second storage device may perform an operation on the prediction result and the reference result by using a loss function, to obtain the error of the prediction result. The loss function includes but is not limited to a cross-entropy loss function, a mean square error loss function, or the like.

In a possible implementation, when the prediction result is the target IO request, the reference result may be an instruction or data actually used by the processor of the second storage device after the second storage device receives the IO request; when the prediction result is the workload information, the reference result may be an actual workload for sending the IO request; when the prediction result is the second allocation information, the reference result may be at least one of the processing resource, the storage resource, or the network resource actually required for each task.

Step (4): The second storage device adjusts the parameters of the initial AI model based on the error of the prediction result.

For example, the initial AI model is a neural network model. In this case, the second storage device may adjust a weight of each convolution kernel at each layer in the initial AI model based on the error of the prediction result by using a backpropagation algorithm.

Step (5): The second storage device repeatedly performs step (2) to step (4) until the error of the prediction result is less than an error threshold or a quantity of iterations reaches a preset quantity of times.

Each time the second storage device receives an IO request, the second storage device may repeatedly perform step (2) to step (4) to adjust the parameters of the initial AI model once. In this way, the initial AI model is optimized with continual parameter adjustment. In an iteration process, the second storage device may determine whether the error of the prediction result is less than the error threshold. When the error of the prediction result is not less than the error threshold, the second storage device continues to perform model training. When the error of the prediction result is less than the error threshold, training of the initial AI model is completed, and the initial AI model is used as the trained AI model.

Figure 4:
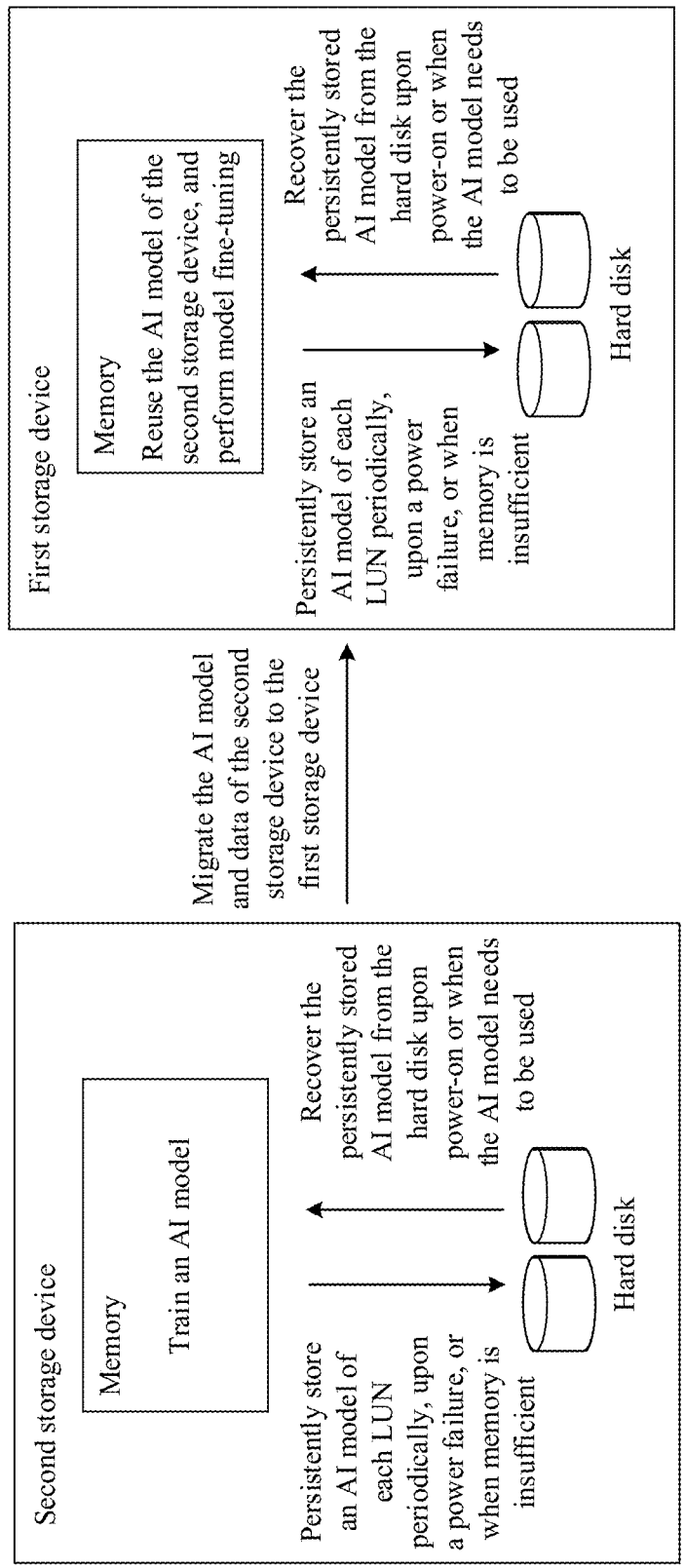
FIG. 4 is a schematic diagram of reusing an AI model in a data migration scenario according to an embodiment of this disclosure.

In some possible embodiments, the second storage device may perform the foregoing model training process by using a CPU. Specifically, when no AI chip is installed on the second storage device, for example, when the second storage device is the second storage device shown in FIG. 2, and the processor 1011 of the controller 101 includes a CPU but does not include any AI chip, as shown in FIG. 4, model training may be performed by the CPU. The CPU may train the AI model in a memory. For example, the CPU may collect data, such as the received IO requests, required for training the AI model, and cache, in the memory, the data required for training the AI model. In a training process, each time the CPU calculates a model parameter, the CPU may cache the model parameter in the memory. When the model parameter is adjusted, the CPU updates the model parameter cached in the memory.

In some other possible embodiments, the second storage device may perform the foregoing model training process by using an AI chip. Specifically, when an AI chip is installed on the second storage device, for example, when the second storage device is the second storage device shown in FIG. 2, and the processor 1011 of the controller 101 includes an AI chip, as shown in FIG. 5 and FIG. 6, model training may be performed by the AI chip.

Figure 5:
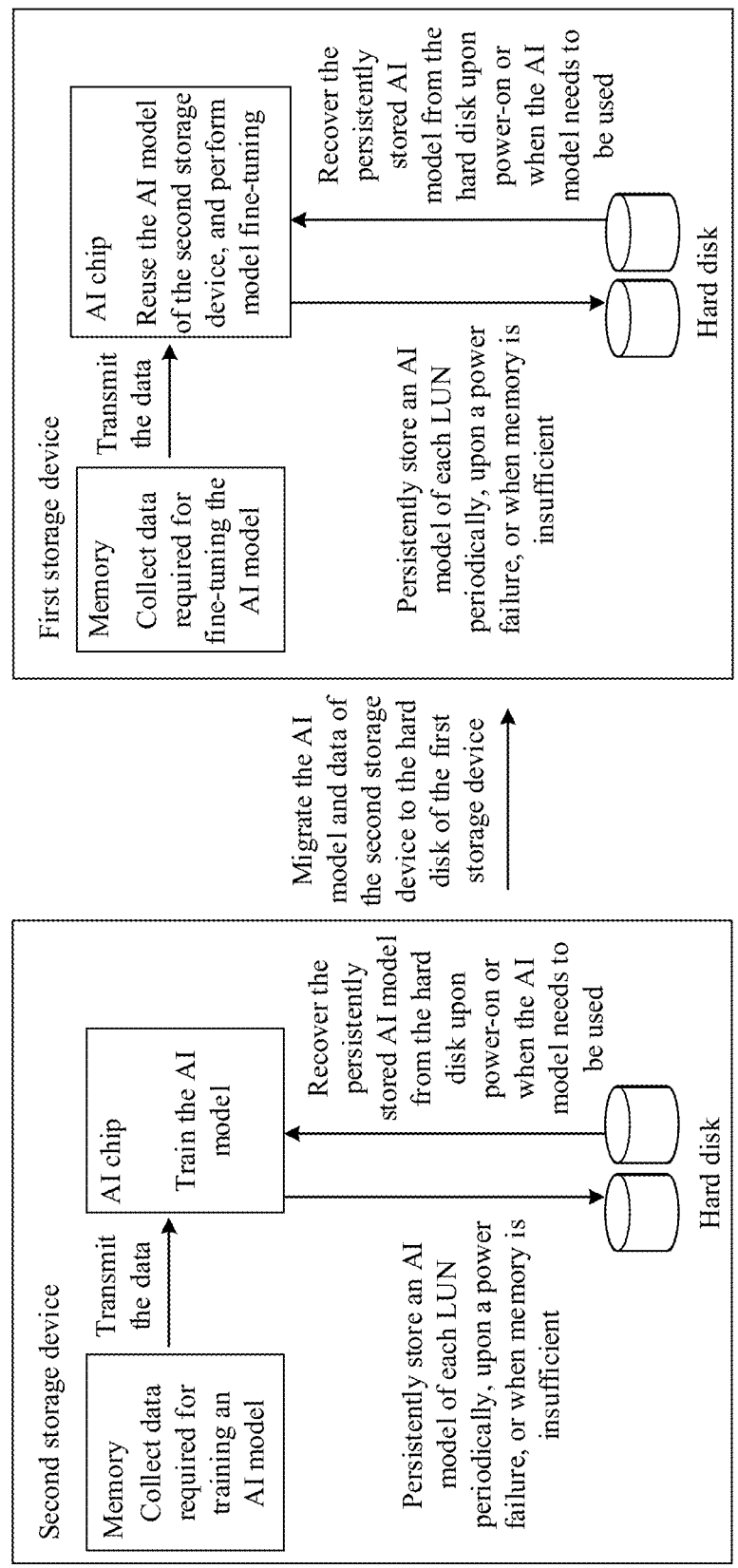
FIG. 5 is a schematic diagram of reusing an AI model in a data migration scenario according to an embodiment of this disclosure.

As shown in FIG. 5, the AI chip may train the AI model in a memory of the second storage device. In a possible implementation, a CPU may collect data required for training the AI model, and send the data required for training the AI model to the AI chip. After the AI chip calculates a model parameter based on the data required for training the AI model, the AI chip may cache the model parameter in the memory. When the AI chip adjusts the model parameter, the AI chip may update the model parameter cached in the memory.

Figure 6:
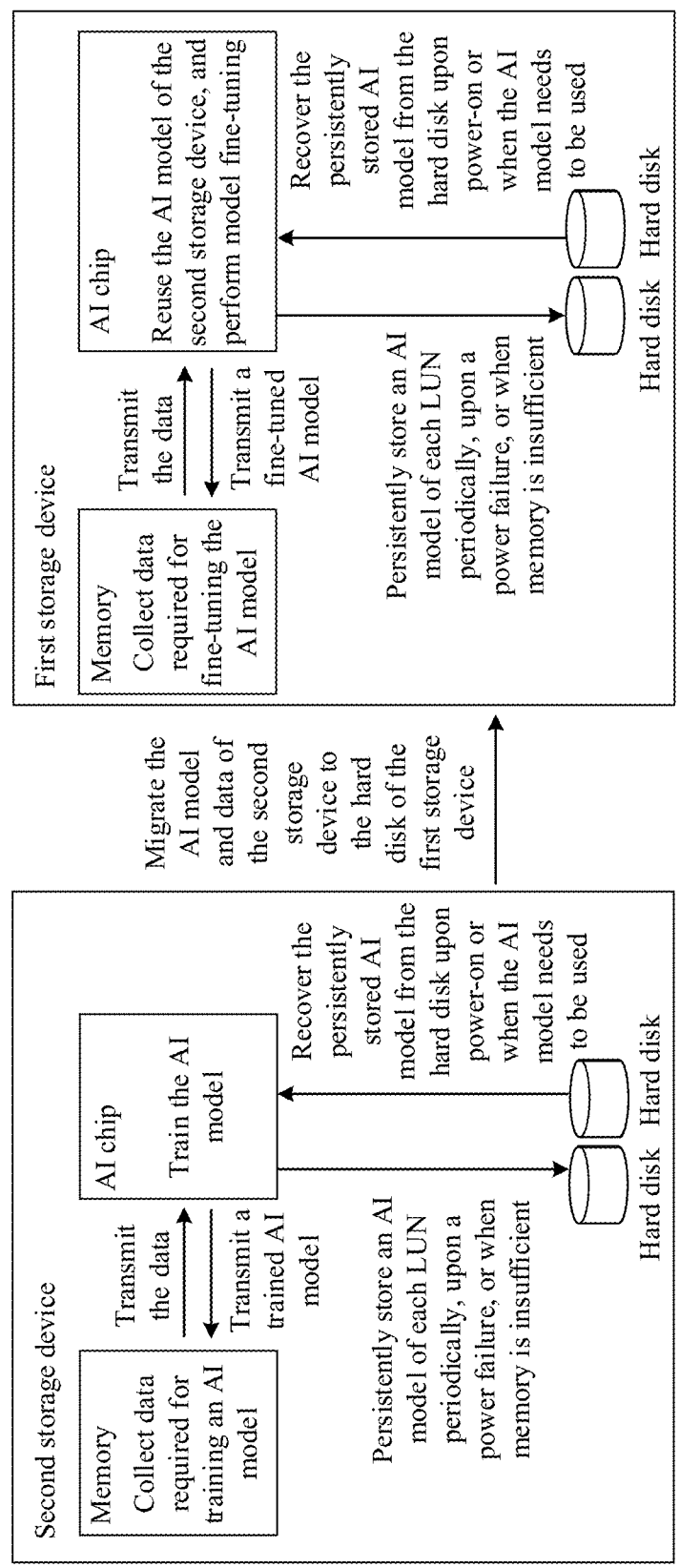
FIG. 6 is a schematic diagram of reusing an AI model in a data migration scenario according to an embodiment of this disclosure.

As shown in FIG. 6, the AI chip may train the AI model in a memory of the AI chip. In a possible implementation, a CPU may collect data required for training the AI model, and cache, in a memory corresponding to the CPU, the data required for training the AI model; and the AI chip may read, from the memory corresponding to the CPU, the data required for training the AI model, and perform model training in the AI chip. For example, each time the AI chip calculates a model parameter, the AI chip caches the model parameter in the memory of the AI chip. When the AI chip adjusts the model parameter, the AI chip may update the model parameter cached in the memory of the AI chip.

It should be additionally noted that, after the AI model is obtained through training, the second storage device may continue to receive an IO request in a running process, and the second storage device may perform model fine-tuning on the AI model based on the IO request. Specifically, the second storage device may obtain a prediction result of the AI model based on the IO request, and the second storage device may adjust the parameters of the AI model based on the prediction result and a reference result. For a manner of adjusting the model parameters, refer to step (4) above. Details are not described herein again.

In some possible embodiments, the second storage device may include one or more LUNs. The second storage device may store data in each LUN separately. In this case, different data of the second storage device may belong to different LUNs. For example, the second storage device may store data of different workloads in different LUNs. For example, data from a workload 1 is stored in a LUN 1, and data from a workload 2 is stored in a LUN 2. In this case, in the second storage device, the data of the workload 1 belongs to the LUN 1, and the data of the workload 2 belongs to the LUN 2. In a running process, the second storage device may receive IO requests for different LUNs. The second storage device may separately perform model training for each LUN based on IO requests of the LUN, to obtain an AI model of the LUN. Hyperparameters of AI models of the different LUNs may be the same. Parameters other than the hyperparameters of the AI models of the different LUNs may be different due to different training processes or fine-tuning processes. For example, an AI model of each LUN is a neural network model, and neural network models of the different LUNs may have a same quantity of layers and a same quantity of convolution kernels, whereas convolution kernels in the neural network models of the different LUNs may have different weights.

For example, when the second storage device includes three LUNs: a LUN 0, a LUN 1, and a LUN 2, the second storage device may perform model training for the LUN 0 based on IO requests for the LUN 0, to obtain an AI model 0 of the LUN 0; perform model training for the LUN 1 based on IO requests for the LUN 1, to obtain an AI model 1 of the LUN 1; and perform model training for the LUN 2 based on IO requests for the LUN 2, to obtain an AI model 2 of the LUN 2. In this example, the second storage device may establish a correspondence shown in Table 1 below.

TABLE 1

| LUN | AI model |
| --- | --- |
| LUN 0 | AI model 0 |
| LUN 1 | AI model 1 |
| LUN 2 | AI model 2 |

Model training is performed for each LUN separately; because different LUNs in a same storage device may store data of different workloads, and there is a specific probability that data access patterns of different workloads are different, there is a specific probability that patterns of IO requests for different LUNs are different, so that there is a specific probability that model parameters applicable to AI models of different LUNs are also different. Therefore, model training is performed for each LUN separately based on IO requests of the LUN, so as to ensure that an AI model of each LUN better matches the corresponding LUN, thereby improving AI model accuracy.

In some possible embodiments, the second storage device may establish a correspondence between a LUN and an AI model, and persistently store the correspondence between a LUN and an AI model, to manage, based on the correspondence, an AI model of each LUN.

The second storage device may allocate hard disk space, and store the correspondence between a LUN and an AI model in the hard disk space, so as to persistently store the correspondence between a LUN and an AI model. In addition, the second storage device may persistently store a correspondence between a LUN and an AI model periodically, or may persistently store a correspondence between a LUN and an AI model when a power failure occurs. The timing of persistent storage is not limited in this embodiment. The correspondence between a LUN and an AI model may include an identifier of the LUN and an identifier of the AI model. The identifier of the LUN is used to determine the corresponding LUN, for example, may be an ID, a number, or a name of the LUN. The identifier of the AI model is used to determine the corresponding AI model, for example, may be an ID, a number, or a name of the AI model. With reference to three application scenarios, namely, cache prefetch, workload identification, and intelligent scheduling, the correspondence between a LUN and an AI model may include one or more of a correspondence between the LUN and the first AI model, a correspondence between the LUN and the second AI model, or a correspondence between the LUN and the third AI model.

Step 303: The second storage device persistently stores the AI model.

In some possible embodiments, the second storage device may allocate hard disk space, and write the AI model to the hard disk space, so as to persistently store the AI model by using a hard disk. For example, as shown in FIG. 2, the processor 1011 of the second storage device may obtain the AI model through training, allocate one or more hard disks 102 to the AI model, and write the AI model to the hard disk 102.

In some possible embodiments, when the second storage device performs the model training process by using the CPU, as shown in FIG. 4, the CPU may move the AI model from the memory to the hard disk, and persistently store the AI model in the hard disk. When the second storage device performs the model training process by using the AI chip, as shown in FIG. 5, the AI chip may move the AI model from the AI chip to the hard disk, and persistently store the AI model in the hard disk; or as shown in FIG. 6, the AI chip may move the AI model from the memory corresponding to the CPU to the hard disk, and persistently store the AI model in the hard disk.

The second storage device may perform step 303 on any occasion. For example, the second storage device may perform step 303 in any one of, but not limited to, the following cases 1 to 3.

Case 1: Periodic storage: The second storage device may store an AI model at an interval of preset duration. The preset duration may be set according to an experiment, experience, or a requirement. This is not limited in this embodiment.

Case 2: Storage in the case of insufficient memory: Specifically, the second storage device may determine whether memory is less than a memory threshold, and write the AI model in the memory to the hard disk space when the memory is less than the memory threshold.

Case 3: Storage upon a power failure: Specifically, when a power failure occurs on the second storage device, a backup power supply of the second storage device may provide electric energy, and the second storage device may write the AI model in the memory to the hard disk space by using the electric energy of the backup power supply.

It should be noted that, when the second storage device performs model fine-tuning on the AI model based on a subsequently received IO request after obtaining the AI model through training, the second storage device may persistently store a fine-tuned AI model. In a possible implementation, when the AI model is already stored in the hard disk space of the second storage device, the second storage device may delete the stored AI model, and store the fine-tuned AI model, so as to update the stored AI model.

In some possible embodiments, after the second storage device persistently stores the AI model, the second storage device may read the AI model from the hard disk space and load the AI model to the memory when the second storage device is powered on. In addition, for ease of invoking the AI model, the second storage device may also read the AI model from the hard disk space and load the AI model to the memory in the event that the AI model needs to be used, for example, when a function such as cache prefetch, workload identification, or intelligent scheduling needs to be provided.

Step 304: The second storage device sends the data and the AI model to the first storage device.

Step 305: The first storage device receives the data and the AI model from the second storage device, where the AI model is obtained by the second storage device through training based on historical IO requests for the data in historical running processes.

The first storage device and the second storage device are different devices. Optionally, the second storage device may be an old device, and the first storage device may be a new device. The storage device of the data can be upgraded and updated by migrating the data from the second storage device to the first storage device.

In some possible embodiments, the second storage device may receive a sending instruction, and send the data and the AI model to the first storage device according to the sending instruction, and the first storage device may receive the data and the AI model from the second storage device. The sending instruction is used to instruct the second storage device to send the data and the AI model. The sending instruction may be triggered by an operation performed by a user on the second storage device. The sending instruction may include one or more of an identifier of the first storage device, an original storage location of the data on the second storage device, an original storage location of the AI model on the second storage device, a target storage location of the data on the first storage device, or a target storage location of the AI model on the first storage device. The target storage location of the data on the first storage device and/or the target storage location of the AI model on the first storage device may be on a hard disk of the first storage device, so as to migrate the data and/or the AI model to the hard disk of the first storage device.

Step 306: The first storage device stores the data and the AI model.

The first storage device may persistently store the data and the AI model. For example, the first storage device may store the data and the AI model in hard disk space.

In some possible embodiments, the second storage device may send, to the first storage device, data and an AI model that correspond to a same LUN, and the first storage device may receive the data and the AI model that correspond to the same LUN, and correspondingly store the data and the AI model. For example, the data sent by the second storage device may belong to a first LUN of the second storage device, and the AI model sent by the second storage device may be an AI model of the first LUN. The first LUN may be any of one or more LUNs of the second storage device. For example, as shown in Table 1, when the data sent by the second storage device belongs to the LUN 0, the AI model sent by the second storage device may be the AI model 0 of the LUN 0; when the data sent by the second storage device belongs to the LUN 1, the AI model sent by the second storage device may be the AI model 1 of the LUN 1.

It should be noted that the foregoing provides descriptions by using only an example in which the data belonging to the first LUN and the AI model of the first LUN are sent. In some possible embodiments, the second storage device may include a plurality of LUNs, and the second storage device may train a corresponding AI model for data of each of the plurality of LUNs separately. In this case, the second storage device may send data of all the LUNs and AI models of all the LUNs to the first storage device. In addition, the second storage device may send a correspondence between a LUN and an AI model to the first storage device, and the first storage device may receive the correspondence between a LUN and an AI model from the second storage device, and store the correspondence between a LUN and an AI model.

Step 307: The first storage device receives an access request for the data.

Step 308: The first storage device obtains a prediction result of the AI model based on the access request.

The first storage device may read the AI model from the hard disk space, load the AI model to a memory, and invoke the AI model, to obtain the prediction result. It should be noted that the first storage device may load the AI model from the hard disk space to the memory when the first storage device receives the access request, or may load the AI model from the hard disk space to the memory when the first storage device is powered on. The timing for loading the AI model is not limited in this embodiment.

In some possible embodiments, the first storage device may determine, based on the access request, that the to-be-accessed data belongs to the first LUN, and therefore obtain a prediction result, of the AI model, corresponding to the first LUN. In a possible implementation, the first storage device may query, from one or more LUNs based on a storage address in the access request, a LUN to which the data belongs, to obtain the first LUN; and the first storage device may query the correspondence between a LUN and an AI model based on the first LUN, to obtain the AI model of the first LUN. In this way, the first storage device reuses the corresponding AI model for the first LUN, thereby implementing AI model reuse on a per LUN basis. This can improve prediction result accuracy compared with AI model reuse on a per storage device basis.

For an application scenario of cache prefetch, the AI model from the second storage device may include the first AI model, and the first AI model is used to predict a to-be-received IO request based on a currently received access request. The first storage device may input the access request into the first AI model, and output a target access request. The target access request is a prediction result of the first AI model. The target access request is an access request that is to be received by the first storage device and that is predicted by the first AI model. The target access request may indicate an instruction or data that is to be used by a processor of the first storage device. For example, the target access request may carry metadata or a storage address of the instruction or data.

In some possible embodiments, each time the first storage device receives an access request, the first storage device may input the access request received at a current point in time into the first AI model. In some other possible embodiments, alternatively, when receiving a plurality of access requests, the first storage device may input the plurality of access requests received in a current time period into the first AI model. For example, each time the first storage device receives N access requests, the first storage device may input the N access requests into the first AI model, where N is a positive integer. Alternatively, the first storage device may input, at an interval of duration M, access requests received within the duration M into the first AI model, where M is a positive integer. The quantity of access requests input into the first AI model is not limited in this embodiment.

In some possible embodiments, the first AI model may predict an access request that is to be received by the first storage device at a next point in time, and output a target access request. In some other possible embodiments, the first AI model may alternatively predict access requests that are to be received by the first storage device in a next time period, and output a plurality of target access requests. For example, the first AI model may predict P access requests that are to be received by the first storage device, and output P target access requests, where P is a positive integer. The quantity of target access requests output by the first AI model is not limited in this embodiment.

For an application scenario of workload identification, the AI model from the second storage device may include the second AI model, and the second AI model is used to predict, based on an access characteristic of access requests in a current time period, a workload for sending the access request. The first storage device may collect statistics about the access requests in the current time period, to obtain the access characteristic. The first storage device may input the access characteristic into the second AI model, and output workload information. The workload information is a prediction result of the second AI model. The workload information indicates the workload for sending the access requests.

A process of obtaining the access characteristic through statistics collection may include but is not limited to one or more of (1) to (6) below.

(1) A size of each access request in the current time period is obtained, a maximum access request is selected from all access requests in the current time period based on the size of each access request, and the maximum access request is used as the access characteristic.

(2) A size of each access request in the current time period is obtained, a minimum access request is selected from all access requests in the current time period, and the minimum access request is used as the access characteristic.

(3) It may be determined whether the access requests in the current time period are consecutive access, and a determining result is used as the access characteristic. In a possible implementation, it may be determined whether an interval between a start storage location corresponding to each access request and an end storage location corresponding to a previous access request is less than an interval threshold; and when the interval is less than the interval threshold, it is determined that the access requests are consecutive access.

(4) It may be determined whether the access requests in the current time period are random access, and a determining result is used as the access characteristic. In a possible implementation, it may be determined whether an interval between a start sector address of each access request and an end sector address of a previous access request is greater than or equal to an interval threshold; and when the interval is greater than or equal to the interval threshold, it is determined that the access requests are random access.

(5) It may be determined whether the access requests in the current time period are serial access, and a determining result is used as the access characteristic.

(6) It may be determined whether the access requests in the current time period are parallel access, and a determining result is used as the access characteristic.

For an application scenario of intelligent scheduling, the AI model from the second storage device may include the third AI model, and the third AI model is used to predict, based on a currently received access request and a current resource allocation status, a resource that needs to be allocated to each task. The first storage device may input the access request and first allocation information into the third AI model. The third AI model may predict at least one of a processing resource, a storage resource, or a network resource required for each task, and output second allocation information. The second allocation information is a prediction result of the third AI model.

In some possible embodiments, each time the first storage device receives an access request, the first storage device may input the access request received at a current point in time and first allocation information at the current point in time into the third AI model; alternatively, when receiving a plurality of access requests, the first storage device may input the plurality of access requests received in a current time period and first allocation information at a plurality of points in time in the current time period into the third AI model. An implementation to be used is not limited in this embodiment.

In some possible embodiments, the third AI model may predict at least one of a processing resource, a storage resource, or a network resource required for each task at a next point in time, and in this case, the output second allocation information indicates at least one of the processing resource, the storage resource, or the network resource required for each task at the next time point. Alternatively, the third AI model may predict at least one of a processing resource, a storage resource, or a network resource required for each task in a next time period, and in this case, the output second allocation information indicates at least one of the processing resource, the storage resource, or the network resource required for each task in the next time period. An implementation to be used is not limited in this embodiment.

In some possible embodiments, the first storage device may totally reuse the AI model from the second storage device, or may perform model fine-tuning on the AI model from the second storage device. The totally reusing the AI model means that the first storage device does not change any parameter of the AI model from the second storage device. A process of performing model fine-tuning on the AI model may include the following: After receiving an IO request, the first storage device may obtain a prediction result of the AI model based on the IO request, and the first storage device adjusts a parameter of the AI model based on the prediction result. The IO request may include a data access request and a data write request.

In some possible embodiments, the first storage device may perform a model fine-tuning process by using a CPU. Specifically, when the first storage device is the first storage device shown in FIG. 2, and the processor 1011 of the controller 101 includes a CPU but does not include any AI chip, as shown in FIG. 4, model fine-tuning may be performed by the CPU. The CPU may fine-tune the AI model in a memory. For example, the CPU may collect data, such as the received IO request, required for fine-tuning the AI model, and cache, in the memory, the data required for fine-tuning the AI model. In a fine-tuning process, each time the CPU calculates a model parameter, the CPU may cache the model parameter in the memory. When the model parameter is adjusted, the CPU updates the model parameter cached in the memory.

In some other possible embodiments, the first storage device may perform the foregoing model fine-tuning process by using an AI chip. Specifically, when an AI chip is installed on the first storage device, for example, when the first storage device is the first storage device shown in FIG. 2, and the processor 1011 of the controller 101 includes an AI chip, as shown in FIG. 5 and FIG. 6, model fine-tuning may be performed by the AI chip.

As shown in FIG. 5, the AI chip may perform model fine-tuning on the AI model in the memory. In a possible implementation, a CPU may collect data required for fine-tuning the AI model, and send the data required for fine-tuning the AI model to the AI chip. After the AI chip calculates a model parameter based on the data required for fine-tuning the AI model, the AI chip may cache the model parameter in the memory. When the AI chip adjusts the model parameter, the AI chip may update the model parameter cached in the memory.

As shown in FIG. 6, the AI chip may perform model fine-tuning on the AI model in the AI chip. In a possible implementation, the CPU may collect data required for fine-tuning the AI model, and cache, in a memory corresponding to the CPU, the data required for fine-tuning the AI model. The AI chip may read, from the memory corresponding to the CPU, the data required for fine-tuning the AI model, and perform model fine-tuning in the AI chip. For example, each time the AI chip calculates a model parameter, the AI chip caches the model parameter in a memory of the AI chip. When the AI chip adjusts the model parameter, the AI chip may update the model parameter cached in the memory of the AI chip.

In some possible embodiments, the first storage device may perform model fine-tuning for each LUN separately based on an IO request of the LUN, so as to update an AI model of the LUN. For example, when the first storage device includes three LUNs: a LUN 0, a LUN 1, and a LUN 2, the first storage device may perform, based on an IO request for the LUN 0, model fine-tuning on an AI model 0 of the LUN 0, so as to update the AI model 0 of the LUN 0; perform, based on an IO request for the LUN 1, model fine-tuning on an AI model 1 of the LUN 1, so as to update the AI model 1 of the LUN 1; and perform, based on an IO request for the LUN 2, model fine-tuning on an AI model 2 of the LUN 2, so as to update the AI model 2 of the LUN 2.

Model fine-tuning is separately performed on an AI model of each LUN; because different LUNs in a same storage device may store data of different workloads, and there is a specific probability that data access patterns of different workloads are different, there is a specific probability that patterns of IO requests for different LUNs are different, so that there is a specific probability that model parameters applicable to AI models of different LUNs are also different. Therefore, model fine-tuning is performed for each LUN separately based on an IO request of the LUN, so as to ensure that a fine-tuning manner of an AI model of each LUN better matches the corresponding LUN, thereby improving accuracy of a fine-tuned AI model.

In some possible embodiments, the first storage device may persistently store a fine-tuned AI model, for example, write the fine-tuned AI model to the hard disk space, so as to persistently store the AI model by using the hard disk. When the first storage device receives an IO request again, the first storage device may read the stored fine-tuned AI model, and obtain a prediction result of the fine-tuned AI model based on the IO request.

In some possible embodiments, when the first storage device performs the model fine-tunning process by using the CPU, as shown in FIG. 4, the CPU may move the AI model from the memory to the hard disk, and persistently store the AI model in the hard disk. When the first storage device performs the model fine-tunning process by using the AI chip, as shown in FIG. 5, the AI chip may move the AI model from the AI chip to the hard disk, and persistently store the AI model in the hard disk; or as shown in FIG. 6, the AI chip may move the AI model from the memory corresponding to the CPU to the hard disk, and persistently store the AI model in the hard disk.

The first storage device may persistently store the fine-tuned AI model on any occasion. For example, the first storage device may persistently store the fine-tuned AI model in any one of, but not limited to, the following cases 1 to 3.

Case 1: Periodic storage: The first storage device may store a fine-tuned AI model at an interval of preset duration. The preset duration may be set according to an experiment, experience, or a requirement. This is not limited in this embodiment.

Case 2: Storage in the case of insufficient memory: Specifically, the first storage device may determine whether memory is less than a memory threshold, and write the fine-tuned AI model in the memory to the hard disk space when the memory is less than the memory threshold.

Case 3: Storage upon a power failure: Specifically, when a power failure occurs on the first storage device, a backup power supply of the first storage device may provide electric energy, and the first storage device may write the fine-tuned AI model in the memory to the hard disk space by using the electric energy of the backup power supply.

Step 309: The first storage device provides a target function based on the prediction result of the AI model.

The target function may be any function that can be provided by using the prediction result of the AI model. For example, the target function may be but is not limited to a cache prefetch function or an intelligent scheduling function.

For example, when the prediction result is a target IO request, the providing a target function may include step 1 and step 2 below:

Step 1: The first storage device may read an instruction or data based on the target IO request. For example, the target IO request may be parsed to obtain a storage address, of the instruction or data, carried in the target IO request, and the instruction or data is read from a primary memory or a secondary memory based on the storage address.

Step 2: The first storage device may write the instruction or data to a cache of the first storage device, so as to provide a cache prefetch function.

The instruction or data is written to the cache in advance before a processor uses the instruction or data, so that the processor can read/write the instruction or data in the cache. In this way, because the processor accesses the cache faster than accessing the primary storage and the secondary storage, the processor can quickly obtain the data, so that a data processing speed of the processor is increased, and data processing efficiency of the processor is improved.

For example, when the prediction result is workload information, the providing a target function may include step 1 and step 2 below:

Step 1: The first storage device may query a correspondence between a workload and an access mode based on the workload information, to obtain an access mode corresponding to the workload information.

The correspondence between a workload and an access mode may be prestored in the first storage device. The correspondence between a workload and an access mode is used to indicate an access mode corresponding to each workload. For example, the correspondence between a workload and an access mode may include an identifier of one or more workloads and an identifier of one or more access modes. For example, the correspondence between a workload and an access mode may be shown in Table 2 below.

TABLE 2

| Workload | Access mode |
|---|---|
| Workload 1 | Sequential access |
| Workload 2 | Random access |

Step 2: The first storage device determines, based on the access mode, whether to perform cache prefetch; or the first storage device determines a to-be-prefetched instruction or to-be-prefetched data based on the access mode.

For example, when the access mode is sequential read, the first storage device may determine to perform cache prefetch. For example, the first storage device may read data from a next sector of a last read sector, and write the data to the cache.

For example, when the prediction result is second allocation information, the providing a target function may include step 1 and step 2 below:

Step 1: The first storage device allocates at least one of a processing resource, a storage resource, or a network resource to each task based on the second allocation information.

Step 2: The first storage device processes each task by using a processing resource corresponding to the task; and/or the first storage device stores data corresponding to the task, by using a storage resource corresponding to the task; and/or the first storage device performs network communication for each task by using a network resource corresponding to the task.

In some possible embodiments, the first storage device may perform step 308 and step 309 by using the CPU. In some other possible embodiments, alternatively, the first storage device may perform step 308 by using the AI chip, the AI chip sends the prediction result to the CPU, the CPU receives the prediction result from the AI chip, and the CPU performs step 309.

It should be noted that the three functions, namely, cache prefetch, workload identification, and intelligent scheduling, are merely examples. In some other possible embodiments, alternatively, the AI model may be obtained through training by using IO requests, to implement a function other than cache prefetch, workload identification, and intelligent scheduling. For example, the AI model may be used to implement an intelligent junk data clearance function. Specifically, when data stored in the second storage device includes data of an application A, data of an application B, and data of an application C, where the data of the application B is deleted with high frequency, after the data of the application A, the data of the application B, and the data of the application C are migrated from the second storage device to the first storage device, there is a high probability that the data of the application B still needs to be deleted with high frequency. In view of this, the old storage device may learn, by using an AI model, a rule indicating which data needs to be deleted from the stored data, and the AI model and data are migrated to the new storage device together. In a possible implementation, the second storage device may obtain a fourth AI model through training based on data deletion requests during historical running, the second storage device may send the fourth AI model and the data to the first storage device, and the first storage device may store the data and the fourth AI model, determine to-be-deleted data based on the fourth AI model, and delete the determined data.

In a related technology, in a scenario in which data is migrated from an original storage device to a new storage device, an AI model is not migrated along with data migration; in a running process, the new storage device needs to recollect a large amount of model training data, for example, cache a large quantity of IO requests, and the new storage device needs to perform model retraining. Because a process of performing model retraining and a process of recollecting data consume a huge quantity of processing resources, performance of the new storage device is degraded, and a comparatively long ramping time is required.

According to the method provided in this embodiment, in a scenario in which the data is migrated from the second storage device to the first storage device, the AI model is also migrated from the second storage device to the first storage device, so that the first storage device can reuse the AI model trained by the second storage device, to obtain the prediction result of the AI model. This avoids a procedure of model retraining by the first storage device, and therefore avoids time costs caused by AI model retraining by the first storage device. Because the first storage device obtains the AI model more quickly, the first storage device obtains the prediction result based on the AI model more quickly, and therefore the first storage device provides functions such as cache prefetch, load identification, and intelligent scheduling based on the prediction result more quickly. This greatly improves efficiency of cache prefetch, load identification, and intelligent scheduling.

The foregoing embodiment describes a procedure in which an AI model is reused between two storage devices. In the embodiments of this disclosure, an AI model may also be reused between different LUNs in a same storage device. The following provides descriptions with reference to the embodiment in FIG. 7.

Figure 7:
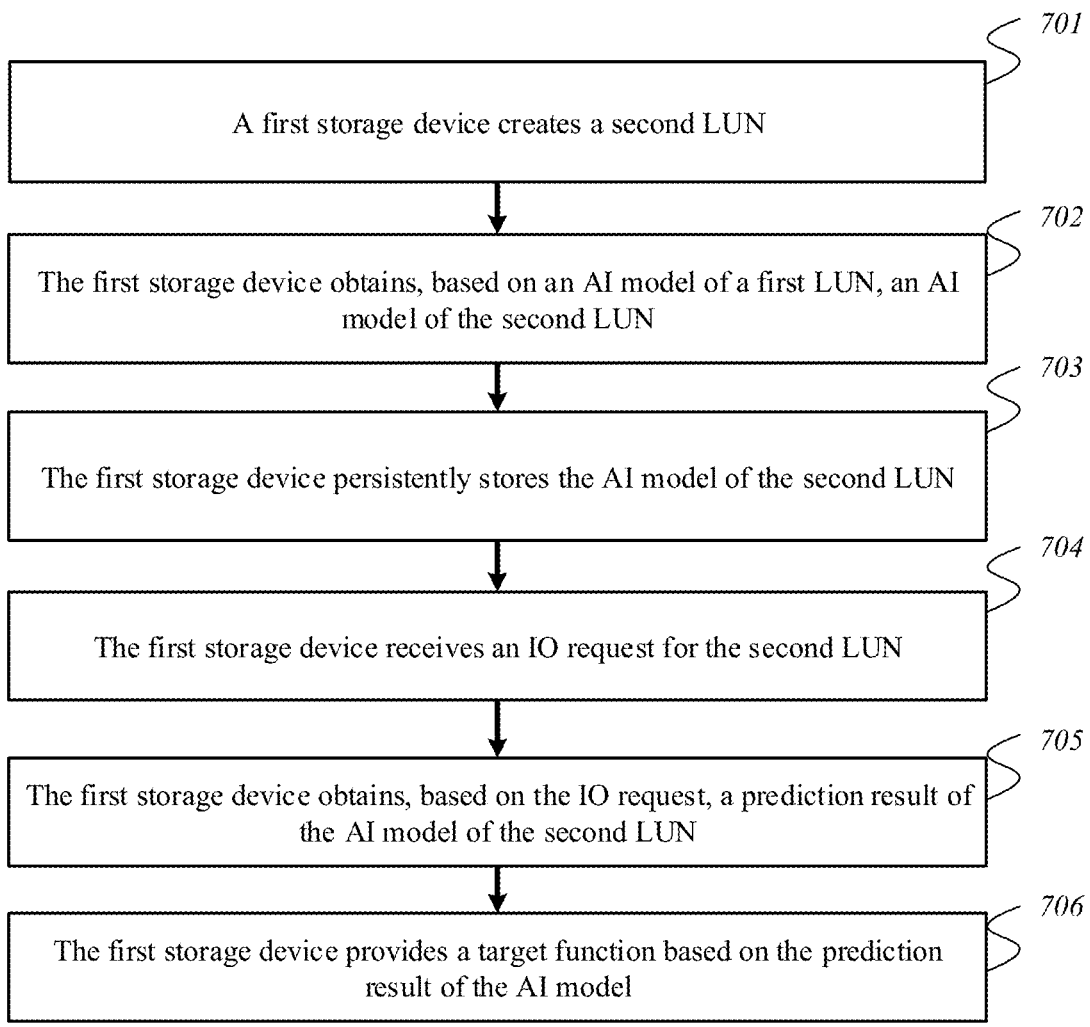
FIG. 7 is a flowchart of an access request processing method according to an embodiment of this disclosure.

FIG. 7 is a flowchart of an access request processing method according to an embodiment of this disclosure. As shown in FIG. 7, the method is applied to a first storage device. The method may include steps 701 to 706 below.

Step 701: The first storage device creates a second LUN.

Figure 8:
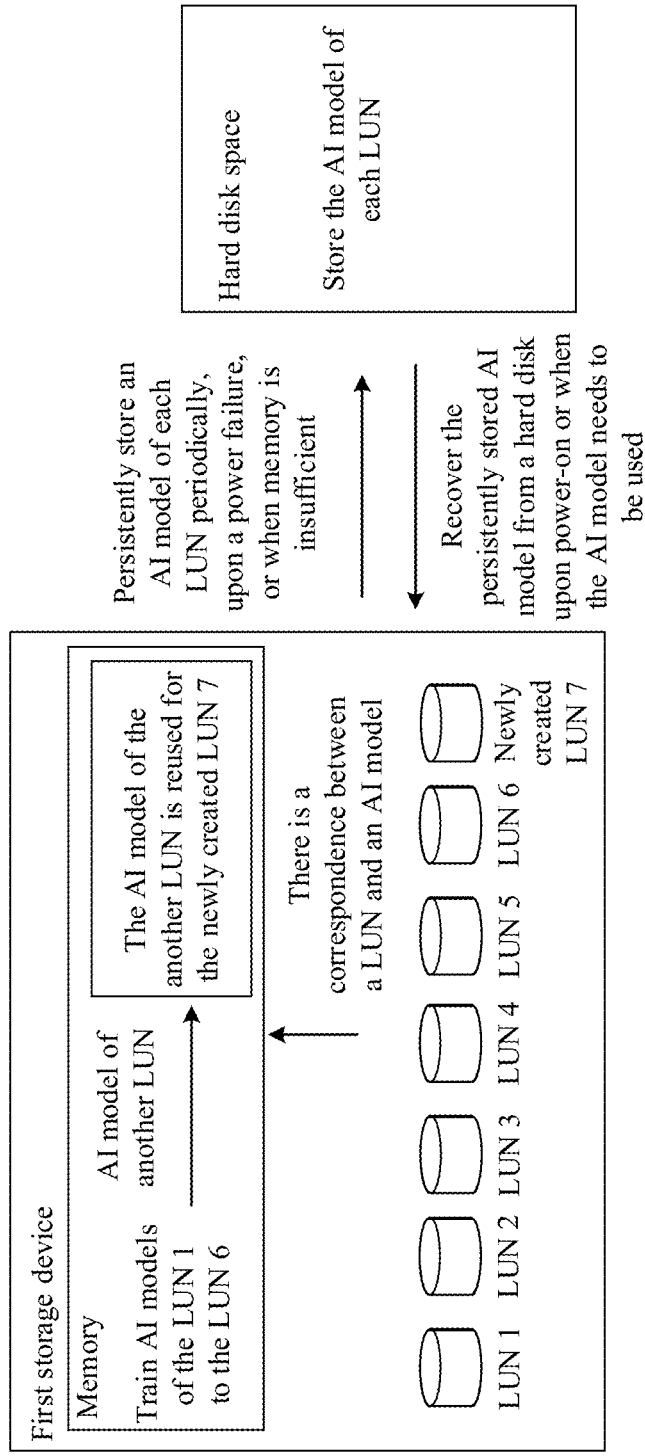
FIG. 8 is a schematic diagram of reusing an AI model in a LUN creation scenario according to an embodiment of this disclosure.
Figure 9:
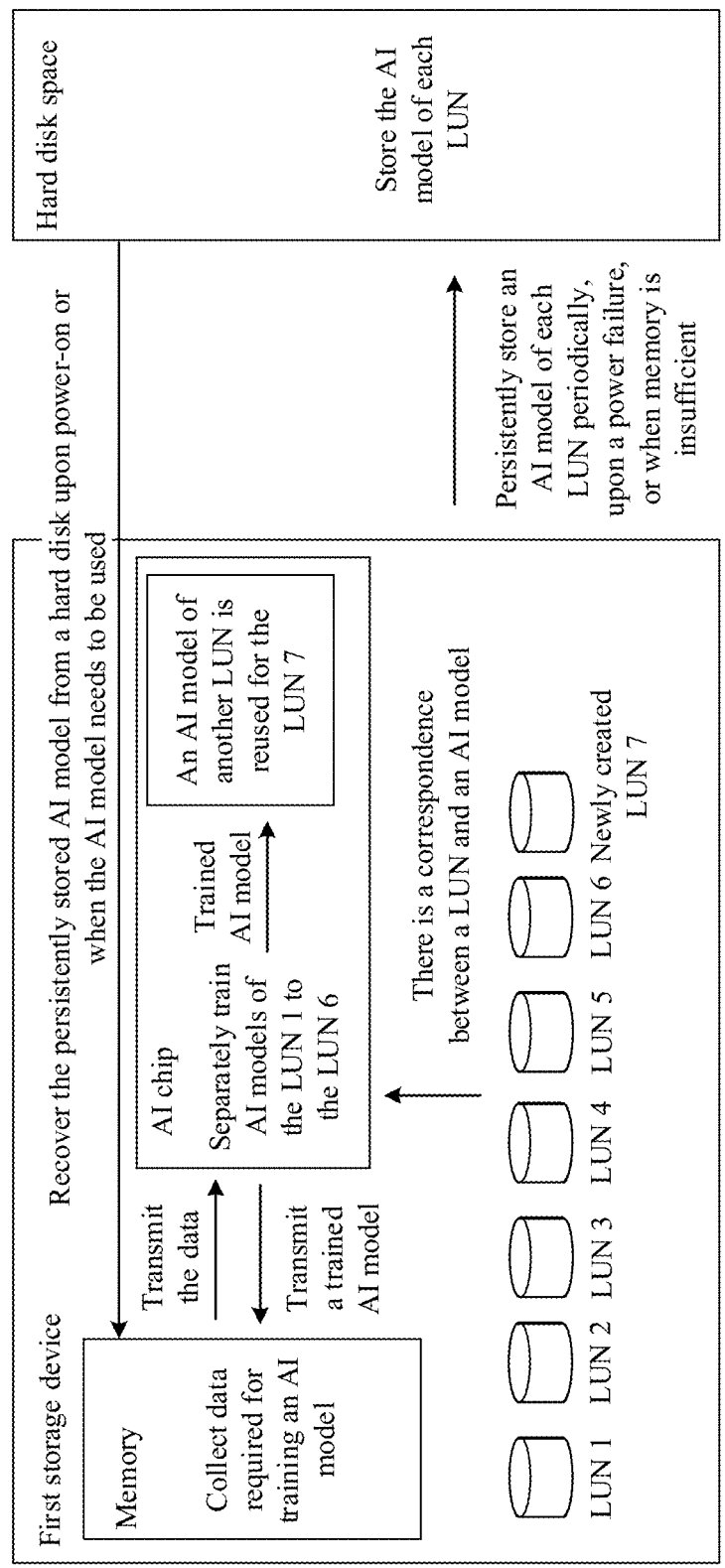
FIG. 9 is a schematic diagram of reusing an AI model in a LUN creation scenario according to an embodiment of this disclosure.
Figure 10:
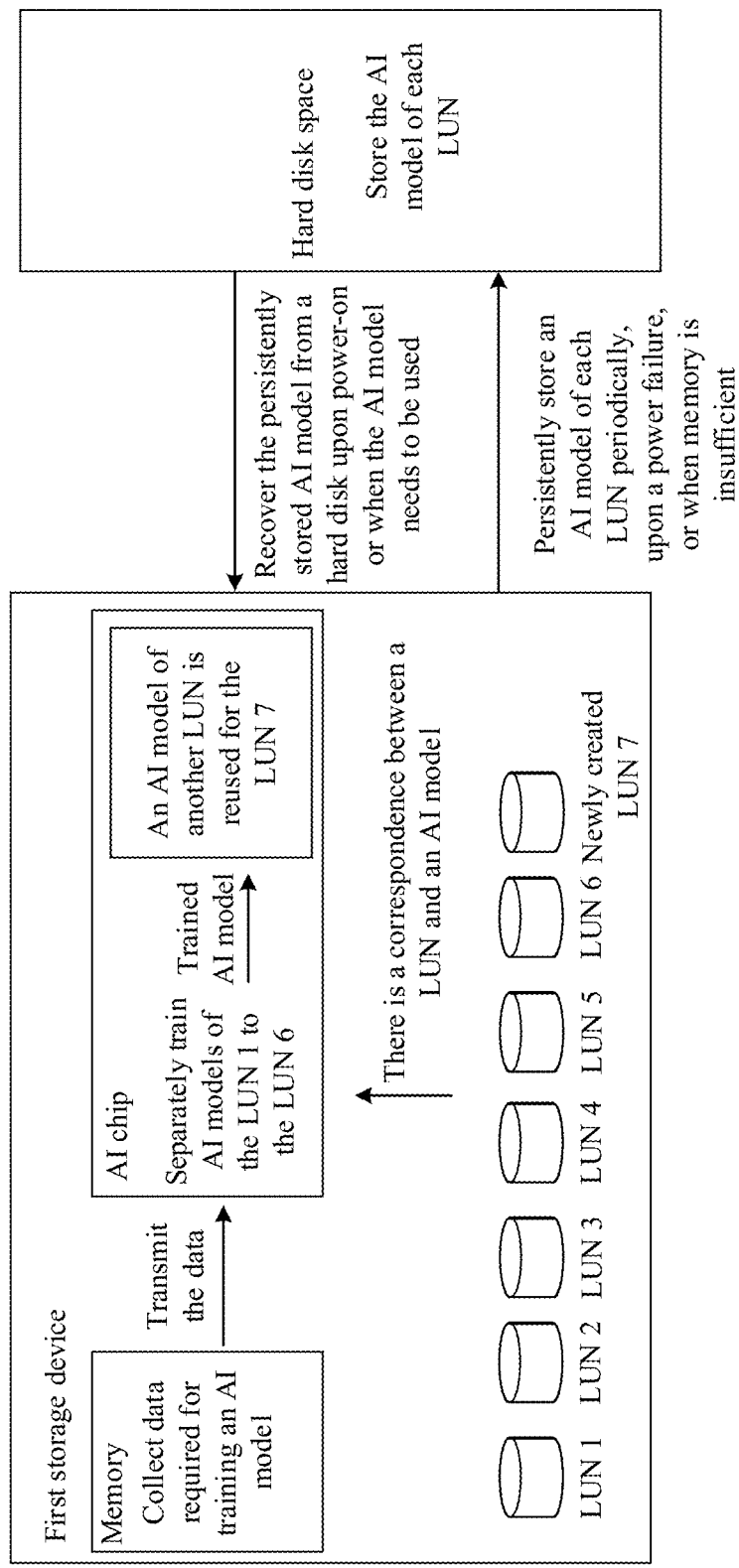
FIG. 10 is a schematic diagram of reusing an AI model in a LUN creation scenario according to an embodiment of this disclosure.

The second LUN is a newly created LUN of the first storage device, and the second LUN is a blank LUN, that is, no data is stored in the second LUN. For example, as shown in FIG. 8 to FIG. 10, the second LUN may be a LUN 7.

Step 702: The first storage device obtains, based on an AI model of a first LUN, an AI model of the second LUN.

In this embodiment, parameters of AI models of all LUNs in a same storage device may be shared. When the second LUN is created, the first storage device may reuse the AI model of the first LUN, to obtain the AI model of the second LUN, so that a parameter of the AI model of the existing first LUN is shared with the AI model of the newly created second LUN.

In some possible embodiments, the first storage device may obtain the parameter of the AI model of the first LUN, and use the parameter of the AI model of the first LUN as an initialization parameter of the AI model of the second LUN, to create the AI model of the second LUN.

In some possible embodiments, there may be one or more first LUNs, and step 703 may include but is not limited to a combination of one or more of the following implementations 1 and 2.

Implementation 1: The first storage device selects one AI model from AI models of the one or more first LUNs, as the AI model of the second LUN. For example, one AI model may be randomly selected from the AI models of the one or more first LUNs, as the AI model of the second LUN. For example, as shown in FIG. 8, after the LUN 7 is created, one AI model may be randomly selected from six AI models of six LUNs, namely, a LUN 1, a LUN 2, . . . , and a LUN 6, as an AI model of the LUN 7.

Implementation 2: The first storage device performs weighted averaging on AI models of the one or more first LUNs, to obtain the AI model of the second LUN. Specifically, weighted averaging may be performed on parameters of the AI models of the one or more first LUNs, and a weighted average value is used as an initialization parameter of the AI model of the second LUN, to create the AI model of the second LUN. Weighted averaging may be performed on model parameters whose locations are the same in the AI models of all the first LUNs. For example, weighted averaging is performed on an AI model 1 and an AI model 2. In this case, weighted averaging may be performed on a weight of a convolution kernel at the $i^{th}$ layer of the AI model 1 and a weight of a convolution kernel at the $i^{th}$ layer of the AI model 2, and an obtained weighted average value is used as a weight of a convolution kernel at the $i^{th}$ layer of an AI model 3, where i is a positive integer.

In some possible embodiments, the implementation 2 may include but is not limited to one or more of the following cases 1 to 3.

Case 1: Weights of all the first LUNs are the same. Specifically, an average value of the AI models of the one or more first LUNs may be obtained as the AI model of the second LUN.

Case 2: A weight of each first LUN is positively correlated with a proportion of a corresponding application identifier in application identifiers corresponding to all the first LUNs. Specifically, a larger proportion of an application identifier corresponding to a first LUN in the application identifiers corresponding to all the first LUNs indicates a larger weight of the first LUN. For example, when the first storage device includes 10 LUNs (a LUN 1 to a LUN 10), eight LUNs (the LUN 1 to a LUN 8) all correspond to a database 1, and two LUNs (a LUN 9 and the LUN 10) correspond to a database 2, weights of AI models of the LUN 1 to the LUN 8 may be greater than weights of AI models of the LUN 9 and the LUN 10.

Case 3: A weight of each first LUN is positively correlated with a proportion of a corresponding user identifier in user identifiers corresponding to all the first LUNs. Specifically, a larger proportion of a user identifier corresponding to a first LUN in the user identifiers corresponding to all the first LUNs indicates a larger weight of the first LUN. For example, when the first storage device includes 10 LUNs (a LUN 1 to a LUN 10), eight LUNs (the LUN 1 to a LUN 8) all correspond to a user 1, and two LUNs (a LUN 9 and the LUN 10) correspond to a user 2, weights of AI models of the LUN 1 to the LUN 8 may be greater than weights of AI models of the LUN 9 and the LUN 10.

In some possible embodiments, the first storage device may include a large quantity of LUNs, and therefore, a calculation amount may be comparatively large when weighted averaging is performed on AI models of all the LUNs. In view of this, the first storage device may select N AI models from the AI modes of all the LUNs, and perform weighted averaging on the selected N AI models, to obtain the AI model of the second LUN. A selection manner may be random selection. N is a positive integer. A certain value of N may be set according to an experiment, experience, or a requirement. This is not limited in this embodiment.

In some possible embodiments, the AI model of the first LUN may include one or more of a first AI model used for cache prefetch, a second AI model used for workload identification, or a third AI model used for intelligent scheduling. Correspondingly, step 702 may include one or more of (1) to (3) below:

(1) Obtain, based on the first AI model of the first LUN, a first AI model of the second LUN.

(2) Obtain, based on the second AI model of the first LUN, a second AI model of the second LUN.

(3) Obtain, based on the third AI model of the first LUN, a third AI model of the second LUN.

It should be noted that this embodiment is described by using only an example in which the AI model of the second LUN is obtained by reusing the AI model of the first LUN. In some other possible embodiments, alternatively, the first storage device may create a third LUN during historical running, and obtain, through training based on historical IO requests for data of the third LUN, an AI model of the third LUN. When the second LUN is created, the first storage device may read the AI model of the third LUN, and obtain, based on the AI model of the third LUN, the AI model of the second LUN.

The third LUN is a LUN that has been created before the first storage device creates the second LUN. For example, after creating the 1st LUN, the first storage device may perform model training based on IO requests for the 1st LUN, to obtain an AI model of the 1st LUN; when creating the 2nd LUN, the first storage device may obtain, based on the AI model of the 1st LUN, an AI model of the 2nd LUN; and when creating the 3rd LUN, the first storage device may obtain, based on the AI model of the 1st LUN and the AI model of the 2nd LUN, an AI model of the 3rd LUN.

For example, as shown in FIG. 8 to FIG. 10, when the first storage device has created a LUN 1, a LUN 2, a LUN 3, . . . , and a LUN 6, when the first storage device creates a LUN 7, the first storage device may obtain, based on an AI model of one or more of the LUN 1, the LUN 2, the LUN 3, . . . , and the LUN 6, an AI model of the LUN 7. In this example, the second LUN is the LUN 7, and the third LUN may include one or more of the LUN 1, the LUN 2, the LUN 3, . . . , and the LUN 6.

In a possible implementation, the first storage device may pre-allocate shared storage space. The shared storage space is used to store an AI model of each LUN. In a running process of the first storage device, each time the first storage device creates a LUN and obtains an AI model of the LUN, the AI model may be written to the shared storage space. When the first storage device creates the second LUN, the first storage device may read, from the shared storage space, the AI model of the first LUN or the AI model of the third LUN. The shared storage space may be hard disk space of the first storage device. For example, as shown in FIG. 8, when the first storage device creates the LUN 7, AI models of the LUN 1, the LUN 2, . . . , and the LUN 6 are stored in the hard disk space.

It should be noted that writing the AI model of each LUN to the shared storage space is merely an example of an implementation. In some other possible embodiments, the first storage device may allocate corresponding storage space to each LUN, establish a correspondence between a LUN and storage space, and store, in storage space corresponding to each LUN, an AI model of the LUN.

Step 703: The first storage device persistently stores the AI model of the second LUN.

In some possible embodiments, the first storage device may allocate hard disk space, and write the AI model of the second LUN to the hard disk space, so as to persistently store the AI model by using a hard disk. When the first storage device stores, in the shared storage space, the AI model of each LUN, the first storage device may write the AI model of the second LUN to the shared storage space. When the first storage device stores, in storage space of each LUN, an AI model of the LUN, the first storage device may allocate storage space to the second LUN, store, in the allocated storage space, the AI model of the second LUN, and establish a correspondence between the allocated storage space and the second LUN.

Step 704: The first storage device receives an IO request for the second LUN.

Step 705: The first storage device obtains, based on the IO request, a prediction result of the AI model of the second LUN.

The IO request for the second LUN may include one or more of an access request and a write request. The access request is used to request to access data belonging to the second LUN, and the write request is used to request to write data to the second LUN. For example, in an application scenario of cache prefetch, the first storage device inputs the IO request into the first AI model of the second LUN, and outputs a target access request, where the target access request indicates an instruction or data that is to be used by a processor of the first storage device; in an application scenario of workload identification, the first storage device may collect statistics about the IO requests in a current time period, to obtain an access characteristic, and the first storage device may input the access characteristic into the second AI model of the second LUN, and output workload information, where the workload information indicates a workload for sending the access request; in an application scenario of intelligent scheduling, the first storage device may input the access request and first allocation information into the third AI model of the second LUN, and output second allocation information, where the first allocation information indicates at least one of a processing resource, a storage resource, or a network resource currently allocated to each task.

When the first storage device writes the AI model of the second LUN to the shared storage space, the first storage device may read, from the shared storage space, the AI model of the second LUN. When the first storage device writes the AI model of the second LUN to the storage space separately allocated to the second LUN, the first storage device may determine, based on a correspondence between the second LUN and the storage space, the storage space allocated to the second LUN, and read, from the storage space, the AI model of the second LUN.

Step 706: The first storage device provides a target function based on the prediction result of the AI model.

Step 706 is the same as step 309, and details are not described herein again.

In some possible embodiments, the second LUN may totally reuse the AI model of the first LUN. The totally reusing the AI model means that the AI model of the first LUN is directly used as the AI model of the second LUN, without changing any parameter of the AI model of the first LUN. In some other possible embodiments, alternatively, model fine-tuning may be performed on the AI model of the first LUN, and a fine-tuned AI model is used as the AI model of the second LUN. A process of performing model fine-tuning on the AI model may include the following: The first storage device may obtain, based on the IO request for the second LUN, a prediction result of the AI model of the first LUN; and the first storage device adjusts, based on the prediction result and a reference result, a parameter of the AI model of the first LUN.

In some possible embodiments, the first storage device may perform the foregoing process by using a CPU. Specifically, when no AI chip is installed on the first storage device, for example, when the first storage device is the first storage device shown in FIG. 2, and the processor 1011 of the controller 101 includes a CPU but does not include any AI chip, model training of the AI model of the first LUN, reuse of the AI model of the first LUN, and model fine-tuning of the AI model of the second LUN may be performed by the CPU. For example, as shown in FIG. 8, the CPU may separately collect data required for training AI models of the LUN 1 to the LUN 6, for example, IO requests for the LUN 1, the LUN 2, . . . , and the LUN 6; train, in the memory, the AI models of the LUN 1 to the LUN 6; and persistently store, in the hard disk space, the AI models of the LUN 1 to the LUN 6. After the CPU creates the LUN 7, the CPU may load, from the hard disk space to the memory, the AI models of the LUN 1 to the LUN 6, and reuse, in the memory, the AI models of the LUN 1 to the LUN 6, to obtain the AI model of the LUN 7, and fine-tune the AI model of the LUN 7. The CPU may collect data required for fine-tuning the AI model of the LUN 7. For example, when an IO request for the LUN 7 is received, the CPU may cache the IO request for the LUN 7 in the memory, and the CPU may obtain an inference result and a reference result based on the IO request and the AI model of the LUN 7, calculate a model parameter based on the inference result and the reference result, and update a parameter of the AI model of the LUN 7 in the memory to the calculated model parameter.

In some other possible embodiments, the first storage device may perform the foregoing process by using an AI chip. Specifically, when an AI chip is installed on the first storage device, for example, when the first storage device is the first storage device shown in FIG. 2, and the processor 1011 of the controller 101 includes an AI chip, model training of the AI model of the first LUN, reuse of the AI model of the first LUN, and model fine-tuning of the AI model of the second LUN may be performed by the AI chip.

An execution body performing prediction by using the AI model of the second LUN may be the AI chip, or may be a CPU.

As shown in FIG. 9, the AI chip may perform model training and model fine-tuning in the memory. Specifically, the CPU may separately collect data required for training AI models of the LUN 1 to the LUN 6, for example, IO requests for the LUN 1, the LUN 2, ..., and the LUN 6, and cache, in the memory, the data required for training the AI models of the LUN 1 to the LUN 6. The AI chip may read, from the memory, the data required for training the AI models of the LUN 1 to the LUN 6, train the AI models of the LUN 1 to the LUN 6, and persistently store, in the hard disk space, the trained AI models of the LUN 1 to the LUN 6. In addition, the AI chip may send the trained AI models to the memory, so that the CPU reads the AI models from the memory, to perform prediction by using the AI models. After the CPU creates the LUN 7, the CPU may load, from the hard disk space to the memory, the AI models of the LUN 1 to the LUN 6, and the AI chip may read, from the memory, the AI models of the LUN 1 to the LUN 6, and reuse the AI models of the LUN 1 to the LUN 6, to obtain the AI model of the LUN 7. In addition, the AI chip may fine-tune the AI model of the LUN 7. Specifically, the CPU may collect data required for fine-tuning the AI model of the LUN 7. For example, when an IO request for the LUN 7 is received, the CPU may cache the IO request for the LUN 7 in the memory. The AI chip may read the IO request for the LUN 7 from the memory, and the AI chip may obtain an inference result and a reference result based on the IO request and the AI model of the LUN 7, calculate a model parameter based on the inference result and the reference result, and update a parameter of the AI model of the LUN 7 in the memory to the calculated model parameter.

As shown in FIG. 10, the AI chip may perform model training and model fine-tuning in the AI chip. Specifically, a difference from FIG. 9 lies in that, after the CPU creates the LUN 7, the CPU may directly load, from the hard disk space to a memory of the AI chip, the AI models of the LUN 1 to the LUN 6, and the AI chip may read, from the memory of the AI chip, the AI models of the LUN 1 to the LUN 6, and reuse the AI models of the LUN 1 to the LUN 6, to obtain the AI model of the LUN 7. In a model fine-tuning process, after calculating a fine-tuned model parameter of the AI model of the LUN 7, the AI chip may update a parameter of the AI model of the LUN 7 in the memory of the AI chip to the calculated model parameter.

When the first storage device performs model fine-tuning on the AI model, the first storage device may persistently store a fine-tuned AI model of the second LUN. The fine-tuned AI model of the second LUN may be persistently stored by the CPU or the AI chip. For example, as shown in FIG. 8, the CPU may move the AI model of the LUN 7 from the memory to the hard disk space, and persistently store the AI model in the hard disk space; or as shown in FIG. 9 and FIG. 10, the AI chip may move the AI model of the LUN 7 from the memory or the AI chip to the hard disk space, and persistently store the AI model in the hard disk space. In addition, the first storage device may persistently store the fine-tuned AI model on any occasion. For example, the first storage device may persistently store the fine-tuned AI model in any one of, but not limited to, the following cases 1 to 3.

Case 1: Periodic storage: The first storage device may store, at an interval of preset duration, a fine-tuned AI model of the second LUN. The preset duration may be set according to an experiment, experience, or a requirement. This is not limited in this embodiment.

Case 2: Storage in the case of insufficient memory: Specifically, the first storage device may determine whether memory is less than a memory threshold, and when the memory is less than the memory threshold, write the fine-tuned AI model of the second LUN in the memory to the hard disk space.

Case 3: Storage upon a power failure: Specifically, when a power failure occurs on the first storage device, a backup power supply of the first storage device may provide electric energy, and the first storage device may write the fine-tuned AI model in the memory to the hard disk space by using the electric energy of the backup power supply.

In some possible embodiments, after the first storage device persistently stores the AI model, when the first storage device is powered on, the first storage device may read, from the hard disk space, the AI model of the second LUN, and load the AI model to the memory. In addition, for ease of invoking the AI model, in any case in which the AI model needs to be used, for example, when a function such as cache prefetch, workload identification, or intelligent scheduling needs to be provided, the first storage device may also read, from the hard disk space, the AI model of the second LUN, and load the AI model to the memory.

In a related technology, each time a storage device newly creates a LUN, in a running process, the storage device needs to collect a large amount of model training data for the newly created LUN, for example, cache a large quantity of IO requests for the newly created LUN, and the storage device needs to perform model training for the newly created LUN. Because a model training process and a data collection process consume a huge quantity of processing resources, performance of the first storage device is degraded, and a comparatively long ramping time is caused. Moreover, this affects efficiency of providing functions such as cache prefetch, load identification, and intelligent scheduling for the newly created LUN by using the AI model.

According to the method provided in this embodiment, in a scenario in which a LUN is created, an AI model of the newly created LUN may be obtained by reusing an AI model of an existing LUN. In this way, a procedure of model training for the newly created LUN is avoided, thereby avoiding time costs caused by model training for the newly created LUN. Because the AI model of the newly created LUN is obtained more quickly, a prediction result is obtained based on the AI model more quickly, and therefore, functions such as cache prefetch, load identification, and intelligent scheduling are provided for the newly created LUN based on the prediction result more quickly. This greatly improves efficiency of cache prefetch, load identification, and intelligent scheduling for the newly created LUN.

All the foregoing optional technical solutions may be randomly combined to form optional embodiments of this disclosure. Details are not described herein.

The foregoing describes the access request processing method in the embodiments of this disclosure. The following describes an access request processing apparatus in the embodiments of this disclosure. It should be understood that the access request processing apparatus has any function of the first storage device in the foregoing method.

Figure 11:
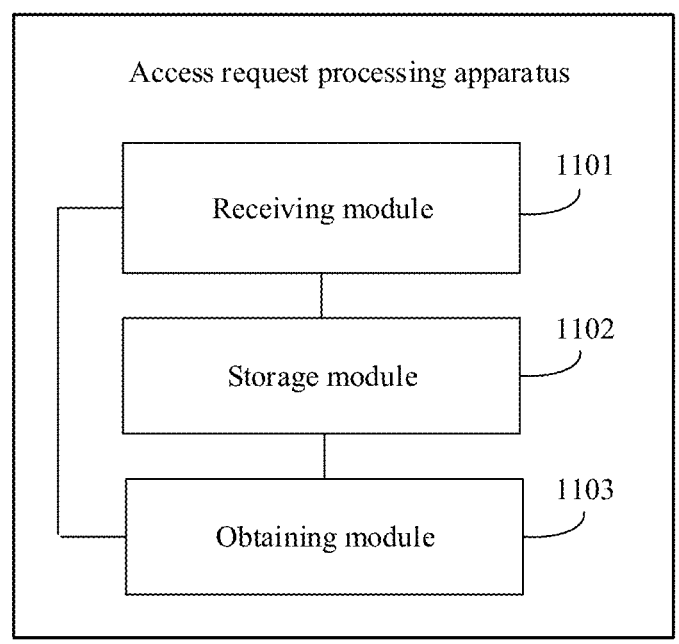
FIG. 11 is a schematic diagram of a structure of an access request processing apparatus according to an embodiment of this disclosure.

FIG. 11 is a schematic diagram of a structure of an access request processing apparatus according to an embodiment of this disclosure. As shown in FIG. 11, the apparatus includes a receiving module 1101, configured to perform step 305; a storage module 1102, configured to perform step 306, where the receiving module 1101 is further configured to perform step 307; and an obtaining module 1103, configured to perform step 308.

Optionally, the data belongs to a first logical storage unit LUN of the second storage device, and the AI model is an AI model of the first LUN.

Optionally, the apparatus further includes a creation module, configured to create a second LUN; and the obtaining module 1103 is further configured to obtain, based on the AI model of the first LUN, an AI model of the second LUN.

Optionally, the obtaining module 1103 is configured to perform any one of the following: selecting one AI model from AI models of one or more first LUNs, as the AI model of the second LUN; or performing weighted averaging on AI models of one or more first LUNs, to obtain the AI model of the second LUN.

Optionally, weights of all the first LUNs are the same; or a weight of each first LUN is positively correlated with a proportion of a corresponding application identifier in application identifiers corresponding to all the first LUNs; or a weight of each first LUN is positively correlated with a proportion of a corresponding user identifier in user identifiers corresponding to all the first LUNs.

Optionally, the AI model includes a first AI model, and the obtaining module 1103 is configured to input the access request into the first AI model, and output a target access request, where the target access request indicates an instruction or data that is to be used by a processor of the first storage device. The storage module 1102 is further configured to write the instruction or data to a cache of the first storage device.

Optionally, the AI model includes a second AI model, and the obtaining module 1103 includes: a statistics collection submodule, configured to collect statistics about the access request in a current time period, to obtain an access characteristic; and an input output submodule, configured to input the access characteristic into the second AI model, and output workload information, where the workload information indicates a workload for sending the access request.

Optionally, the AI model includes a third AI model, and the obtaining module 1103 is configured to input the access request and first allocation information into the third AI model, and output second allocation information, where the first allocation information indicates at least one of a processing resource, a storage resource, or a network resource currently allocated to each task; and the apparatus further includes an allocation module, configured to allocate at least one of the processing resource, the storage resource, or the network resource to each task based on the second allocation information.

It should be noted that, when the access request processing apparatus provided in the embodiment in FIG. 11 processes the access request, division into the foregoing functional modules is merely used as an example for description. In actual application, the foregoing functions may be allocated to different functional modules and implemented according to a requirement. That is, an internal structure of the access request processing apparatus is divided into different functional modules for implementing all or some of the functions described above. In addition, the access request processing apparatus provided in the foregoing embodiment and the access request processing method embodiments belong to a same conception. For a specific implementation process of the access request processing apparatus, refer to the method embodiments. Details are not described herein again.

The foregoing describes the access request processing apparatus in the embodiments of this disclosure. The following describes possible product forms of the access request processing apparatus.

In a possible product form, the access request processing apparatus may be implemented by a chip, and the chip may be a general purpose processor.

For example, the chip may include a processing circuit, an input interface internally connected to and communicating with the processing circuit, and a storage medium. The processing circuit is configured to perform step 308. The input interface is configured to perform step 305 and step 307. The storage medium is configured to perform step 306. Optionally, the storage medium is further configured to store an instruction executed by the processing circuit.

In a possible product form, the access request processing apparatus in the embodiments of this disclosure may be alternatively implemented by using the following: one or more FPGAs, a PLD, a complex programmable logic device (CPLD), a controller, an application-specific integrated circuit (ASIC), a state machine, gate logic, a discrete hardware component, a transistor logic device, a network processor (NP), any other suitable circuit, or any combination of circuits capable of performing various functions described throughout this disclosure.

It should be understood that any form of product having a function of the first storage device in the foregoing method embodiments falls within the protection scope of this disclosure. It should be further understood that the foregoing description is merely an example, and a product form of the access request processing apparatus in the embodiments of this disclosure is not limited thereto.

A person of ordinary skill in the art may be aware that, in combination with the examples described in the embodiments disclosed in this specification, method steps and modules can be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and module, reference may be made to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, division into the modules is merely logical function division and may be other division in an actual implementation. For example, a plurality of modules or components may be combined or integrated into another system, or some features may be ignored or not performed. In addition, the displayed or discussed mutual couplings or direct couplings or communication connections may be implemented through some interfaces, indirect couplings or communication connections between the apparatuses or modules, or electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected according to actual requirements to achieve the objectives of the solutions in the embodiments of this disclosure.

In addition, functional modules in the embodiments of this disclosure may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions in this disclosure essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this disclosure, but are not intended to limit the protection scope of this disclosure. Any equivalent modification or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An access request processing method, wherein the method comprises:
   receiving, by a first storage device, an artificial intelligence (AI) model from a second storage device, wherein the AI model is obtained by the second storage device through training based on historical input/output (IO) requests in historical running processes; and
   obtaining, by the first storage device, a prediction result of the AI model based on an access request received by the first storage device;
   wherein the AI model is obtained by the second storage device through training based on the historical input/output (IO) requests for a first logical storage unit (LUN) of the second storage device; and
   wherein the access request is for a second LUN created on the first storage device and the first LUN and the second LUN are mirrored LUNs.

2. The method according to claim 1, wherein there is one or more first LUNs, and the obtaining, by the second storage device and based on the AI model of the first LUN, the AI model of the second LUN comprises:
   selecting one AI model from AI models of the one or more first LUNs as the AI model of the second LUN.

3. The method according to claim 1, wherein there is one or more first LUNs, and the obtaining, by the second storage device and based on the AI model of the first LUN, an AI model of the second LUN comprises:
   performing weighted averaging on AI models of the one or more first LUNs, to obtain the AI model of the second LUN.

4. The method according to claim 1, wherein the first LUN and the second LUN are dual-active LUNs.

5. The method according to claim 1, wherein the second LUN is a destination LUN for migrating data from the first LUN.

6. A first storage device comprising:
   an input/output interface; and
   a processor coupled to the interface and configured to:
   receive an artificial intelligence (AI) model from a second storage device, wherein the AI model is obtained by the second storage device through training based on historical input/output (IO) requests in historical running processes; and
   obtain a prediction result of the AI model based on an access request received by the first storage device;
   wherein the AI model is obtained by the second storage device through training based on the historical input/output (IO) requests for a first logical storage unit (LUN) of the second storage device; and
   wherein the access request is for a second LUN created on the first storage device and the first LUN and the second LUN are mirrored LUNs.

7. The first storage device according to claim 6, wherein there is one or more first LUNs; the processor is configured to:
   select one AI model from AI models of the one or more first LUNs as the AI model of the second LUN.

8. The first storage device according to claim 6, wherein there is one or more first LUNs; the processor is configured to:
   perform weighted averaging on AI models of the one or more first LUNs, to obtain the AI model of the second LUN.

9. The first storage device according to claim 6, wherein the first LUN and the second LUN are dual-active LUNs.

10. The first storage device according to claim 6, wherein the second LUN is a destination LUN for migrating data from the first LUN.

11. A storage system comprising a first storage device and a second storage device, wherein the first storage device is configured to:
    receive an artificial intelligence (AI) model from the second storage device, wherein the AI model is obtained by the second storage device through training based on historical input/output (IO) requests in historical running processes; and
    obtain a prediction result of the AI model based on an access request received by the first storage device;
    wherein the second storage device is configured to:
    send the AI model to the first storage device;
    wherein the AI model is obtained by the second storage device through training based on the historical input/output (IO) requests for a first logical storage unit (LUN) of the second storage device; and
    wherein the access request is for a second LUN created on the first storage device and the first LUN and the second LUN are mirrored LUNs.

12. The storage system according to claim 11, wherein there is one or more first LUNs; the first storage device is configured to:

select one AI model from AI models of the one or more first LUNs as the AI model of the second LUN.

\* \* \* \* \*